(12) United States Patent
Terrell, II et al.

(10) Patent No.: US 8,868,420 B1
(45) Date of Patent: Oct. 21, 2014

(54) CONTINUOUS SPEECH TRANSCRIPTION PERFORMANCE INDICATION

(71) Applicant: Canyon IP Holdings LLC, Wilmington, DE (US)

(72) Inventors: James Richard Terrell, II, Charlotte, NC (US); Marc White, Charlotte, NC (US); Igor Roditis Jablokov, Charlotte, NC (US)

(73) Assignee: Canyon IP Holdings LLC, Wilmington, DE (US)

( * ) Notice: Subject to any disclaimer, the term of this patent is extended or adjusted under 35 U.S.C. 154(b) by 0 days.

(21) Appl. No.: 14/010,433

(22) Filed: Aug. 26, 2013

Related U.S. Application Data

(63) Continuation of application No. 13/621,179, filed on Sep. 15, 2012, now Pat. No. 8,543,396, which is a
(Continued)

(51) Int. Cl.
*G10L 21/00* (2013.01)

(52) U.S. Cl.
USPC ........................................ 704/235; 369/25.01

(58) Field of Classification Search
USPC .......................................................... 704/235
See application file for complete search history.

(56) References Cited

U.S. PATENT DOCUMENTS

| | | |
|---|---|---|
| 5,036,538 A | 7/1991 | Oken et al. |
| 5,675,507 A | 10/1997 | Bobo, II |

(Continued)

FOREIGN PATENT DOCUMENTS

| | | |
|---|---|---|
| EP | 1274222 A2 | 1/2003 |
| WO | WO 2006101528 A1 | 9/2006 |

OTHER PUBLICATIONS

David H. Kemsley, et al. A Survey of Neural Network Research and Fielded Applications, 1992, in International Journal of Neural Networks: Research and Applications, vol. 2, No. 2/3/4, pp. 123-133. Accessed on Oct. 25, 2007 at https://citeseer.ist. psu.edu/cache/papers/cs/25638lftp:zSzzSzaxon.cs. byu. eduzSzpubzSzpaperszSzkemsley 92. pdf/kemsley92survey. pdf, 12 pages total.

(Continued)

*Primary Examiner* — Daniel D Abebe
(74) *Attorney, Agent, or Firm* — Knobbe, Martens, Olson & Bear LLP

(57) ABSTRACT

A method of providing speech transcription performance indication includes receiving, at a user device data representing text transcribed from an audio stream by an ASR system, and data representing a metric associated with the audio stream; displaying, via the user device, said text; and via the user device, providing, in user-perceptible form, an indicator of said metric. Another method includes displaying, by a user device, text transcribed from an audio stream by an ASR system; and via the user device, providing, in user-perceptible form, an indicator of a level of background noise of the audio stream. Another method includes receiving data representing an audio stream; converting said data representing an audio stream to text via an ASR system; determining a metric associated with the audio stream; transmitting data representing said text to a user device; and transmitting data representing said metric to the user device.

20 Claims, 22 Drawing Sheets

Related U.S. Application Data continuation of application No. 12/197,213, filed on Aug. 22, 2008, now Pat. No. 8,510,109.

(60) Provisional application No. 60/957,386, filed on Aug. 22, 2007, provisional application No. 60/957,393, filed on Aug. 22, 2007, provisional application No. 60/957,701, filed on Aug. 23, 2007, provisional application No. 60/957,702, filed on Aug. 23, 2007, provisional application No. 60/957,706, filed on Aug. 23, 2007, provisional application No. 60/972,851, filed on Sep. 17, 2007, provisional application No. 60/972,853, filed on Sep. 17, 2007, provisional application No. 60/972,854, filed on Sep. 17, 2007, provisional application No. 60/972,936, filed on Sep. 17, 2007, provisional application No. 60/972,943, filed on Sep. 17, 2007, provisional application No. 60/972,944, filed on Sep. 17, 2007, provisional application No. 61/016,586, filed on Dec. 25, 2007, provisional application No. 61/021,335, filed on Jan. 16, 2008, provisional application No. 61/021,341, filed on Jan. 16, 2008, provisional application No. 61/034,815, filed on Mar. 7, 2008, provisional application No. 61/038,046, filed on Mar. 19, 2008, provisional application No. 61/041,219, filed on Mar. 31, 2008.

(56) References Cited

U.S. PATENT DOCUMENTS

| | | | |
|---|---|---|---|
| 5,974,413 | A | 10/1999 | Beauregard et al. |
| 6,100,882 | A | 8/2000 | Sharman et al. |
| 6,173,259 | B1 | 1/2001 | Bijl et al. |
| 6,212,498 | B1 | 4/2001 | Sherwood et al. |
| 6,219,638 | B1 | 4/2001 | Padmanabhan et al. |
| 6,298,326 | B1 | 10/2001 | Feller |
| 6,453,290 | B1 | 9/2002 | Jochumson |
| 6,490,561 | B1 | 12/2002 | Wilson et al. |
| 6,532,446 | B1 | 3/2003 | King |
| 6,604,077 | B2 | 8/2003 | Dragosh et al. |
| 6,654,448 | B1 | 11/2003 | Agraharam et al. |
| 6,687,339 | B2 | 2/2004 | Martin |
| 6,687,689 | B1 | 2/2004 | Fung et al. |
| 6,760,700 | B2 | 7/2004 | Lewis et al. |
| 6,775,360 | B2 | 8/2004 | Davidson et al. |
| 6,816,578 | B1 | 11/2004 | Kredo et al. |
| 6,820,055 | B2 | 11/2004 | Saindon et al. |
| 6,865,258 | B1* | 3/2005 | Polcyn ............... 379/88.01 |
| 6,895,084 | B1 | 5/2005 | Saylor et al. |
| 7,047,200 | B2 | 5/2006 | Schmid et al. |
| 7,133,513 | B1 | 11/2006 | Zhang |
| 7,200,555 | B1 | 4/2007 | Ballard et al. |
| 7,206,932 | B1 | 4/2007 | Kirchhoff |
| 7,225,224 | B2 | 5/2007 | Nakamura |
| 7,233,655 | B2 | 6/2007 | Gailey et al. |
| 7,236,580 | B1 | 6/2007 | Sarkar et al. |
| 7,254,384 | B2 | 8/2007 | Gailey et al. |
| 7,302,280 | B2 | 11/2007 | Hinckley et al. |
| 7,330,815 | B1 | 2/2008 | Jochumson |
| 7,363,229 | B2 | 4/2008 | Falcon et al. |
| 7,571,100 | B2 | 8/2009 | Lenir et al. |
| 7,577,569 | B2 | 8/2009 | Roth et al. |
| 7,590,534 | B2 | 9/2009 | Vatland |
| 7,689,415 | B1 | 3/2010 | Jochumson |
| 7,890,586 | B1 | 2/2011 | McNamara et al. |
| 8,032,372 | B1 | 10/2011 | Zimmerman et al. |
| 8,050,918 | B2 | 11/2011 | Ghasemi et al. |
| 8,209,184 | B1 | 6/2012 | Dragosh et al. |
| 8,355,920 | B2* | 1/2013 | Gopinath et al. .......... 704/270 |
| 8,401,850 | B1 | 3/2013 | Jochumson |
| 2002/0016712 | A1* | 2/2002 | Geurts et al. ............. 704/275 |
| 2002/0165719 | A1 | 11/2002 | Wang et al. |
| 2003/0008661 | A1 | 1/2003 | Joyce et al. |
| 2003/0050778 | A1 | 3/2003 | Nguyen et al. |
| 2003/0105630 | A1 | 6/2003 | MacGinitie et al. |
| 2003/0126216 | A1 | 7/2003 | Avila et al. |
| 2003/0200093 | A1 | 10/2003 | Lewis et al. |
| 2003/0212554 | A1 | 11/2003 | Vatland |
| 2003/0220798 | A1 | 11/2003 | Schmid et al. |
| 2004/0005877 | A1 | 1/2004 | Vaananen |
| 2004/0015547 | A1 | 1/2004 | Griffin et al. |
| 2004/0107107 | A1 | 6/2004 | Lenir et al. |
| 2004/0151358 | A1 | 8/2004 | Yanagita et al. |
| 2005/0010641 | A1 | 1/2005 | Staack |
| 2005/0021344 | A1 | 1/2005 | Davis et al. |
| 2005/0080786 | A1 | 4/2005 | Fish et al. |
| 2005/0101355 | A1 | 5/2005 | Hon et al. |
| 2005/0197145 | A1 | 9/2005 | Chae et al. |
| 2005/0209868 | A1 | 9/2005 | Wan et al. |
| 2005/0261907 | A1 | 11/2005 | Smolenski et al. |
| 2005/0288926 | A1 | 12/2005 | Benco et al. |
| 2006/0052127 | A1 | 3/2006 | Wolter |
| 2006/0053016 | A1 | 3/2006 | Falcon et al. |
| 2006/0122834 | A1 | 6/2006 | Bennett |
| 2006/0161429 | A1 | 7/2006 | Falcon et al. |
| 2006/0195318 | A1* | 8/2006 | Stanglmayr ............... 704/235 |
| 2006/0217159 | A1 | 9/2006 | Watson |
| 2007/0043569 | A1 | 2/2007 | Potter et al. |
| 2007/0115845 | A1 | 5/2007 | Hochwarth et al. |
| 2007/0156400 | A1 | 7/2007 | Wheeler |
| 2007/0180718 | A1 | 8/2007 | Fourquin et al. |
| 2007/0239837 | A1 | 10/2007 | Jablokov et al. |
| 2007/0255794 | A1 | 11/2007 | Coutts |
| 2008/0063155 | A1 | 3/2008 | Doulton |
| 2008/0195588 | A1 | 8/2008 | Kim et al. |
| 2008/0261564 | A1 | 10/2008 | Logan |
| 2008/0275864 | A1 | 11/2008 | Kim et al. |
| 2008/0275873 | A1 | 11/2008 | Bosarge et al. |
| 2009/0076917 | A1 | 3/2009 | Jablokov et al. |
| 2009/0083032 | A1 | 3/2009 | Jablokov et al. |
| 2009/0124272 | A1 | 5/2009 | White et al. |
| 2009/0125299 | A1* | 5/2009 | Wang ...................... 704/201 |
| 2009/0163187 | A1 | 6/2009 | Terrell, II |
| 2009/0182560 | A1 | 7/2009 | White |
| 2009/0228274 | A1 | 9/2009 | Terrell, II et al. |
| 2009/0240488 | A1 | 9/2009 | White et al. |
| 2009/0248415 | A1 | 10/2009 | Jablokov et al. |
| 2009/0276215 | A1 | 11/2009 | Hager |
| 2010/0049525 | A1 | 2/2010 | Paden et al. |
| 2010/0058200 | A1 | 3/2010 | Jablokov et al. |
| 2010/0180202 | A1 | 7/2010 | Del Valle Lopez |

OTHER PUBLICATIONS

Desilets, A., Bruijn, B., Martin, J., 2002, Extracting keyphrases from spoken audio documents, Springer-Verlag Berlin Heidelberg, 15 pages.

Fielding, et al., Hypertext Transfer Protocol-HTTP/ 1.1, RFC 2616, Network Working Group (Jun. 1999), sections 7,9.5, 14.30, 12 pages total.

Glaser et al., Web-based Telephony Bridges for the Deaf, Proc. South African Telecommunications Networks & Applications Conference (2001), Wild Coast Sun, South Africa, 5 pages total.

Transl8it! Translation engine, publicly available on http://www.transl8it.com since May 30, 2002. Retrieved on Oct. 26, 2007, 6 pages total.

vBulietin Community Forum, thread posted on Mar. 5,2004. Page retrieved on Oct. 26, 2007 from http://www.vbulletin.com/forum/showthread.php?t=96976, 1 page total.

J2EE Application Overview, publicly available on http://www/orionserver.com/docs/j2eeoverview.html since Mar. 1, 2001. Retrieved on Oct. 26, 2007, 3 pages total.

Lewis et al., SoftBridge: An Architecture for Building IP-based Bridges over the Digital Divide. Proc. South African Telecommunications Networks & Applications Conference (SATNAC 2002), Drakensberg, South Africa, 5 pages total.

(56) References Cited

OTHER PUBLICATIONS

"International Search Report" and "Written Opinion of the International Search Authority" (Korean Intellectual Property Office) in Yap, Inc. International Patent Application Serial No. PCT/US2007/008621, dated Nov. 13, 2007, 13 pages total.

Marshall, James, HTTP Made Really Easy, Aug. 15, 1997, retrieved from http://www.jmarshall.com/easy/http/ on Jul. 25, 2008, 15 pages total.

Knudsen, Jonathan, Session Handling in MIDP, Jan. 2002, retrieved from http://developers.sun.com/mobility/midp/articles/sessions on Jul. 25, 2008, 7 pages total.

\* cited by examiner

```
<result>
    <word conf=90 vol=50 noise=5>please<\word>
    <word conf=90 vol=50 noise=10>meet<\word>
    <word conf=90 vol=60 noise=20>me<\word>
    <word conf=70 vol=65 noise=25>for<\word>
    <word conf=50 vol=70 noise=30>toffee<\word>
    <word conf=90 vol=40 noise=15>at<\word>
    <word conf=80 vol=30 noise=0>one<\word>
<\result>
```

```
POST /Yap/Login HTTP/1.1
Host: www.icynine.com:8080
User-Agent:  Motorola-V3m Obigo/Q04C1 MMP/2.0 Profile/MIDP-2.0
Accept: application/xhtml+xml,text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Yap-Phone-Number: 15615551234
Yap-User-ID: 1143
Yap-Version: 1.0.3
Yap-Audio-Record: amr
Yap-Audio-Play: amr
Connection: close
```

*FIG. 14*

Login/Login HEADER

| Request Headers | Request Body | Response Body |
|---|---|---|
| User-Agent | NA | YAP URL |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

FIG. 15

Yap/Login HEADER

| Request Headers | Request Body | Response Body |
|---|---|---|
| User-Agent | NA | YAP SessionId |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

FIG. 16

SUBMIT HEADER

| Request Headers | Request Body | Response Body |
|---|---|---|
| User-Agent | Binary Audio Data | Submit Receipt |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-Filter-Set | | |
| Yap-ASR-Engine (optional) | | |
| Yap-Return-Cells | | |
| Yap-Return-TTS | | |
| Yap-Content-Type | | |
| Yap-Content-Length | | |

Binary Data Field

FIG. 17

| RESULTS HEADER | | |
|---|---|---|
| Request Headers | Request Body | Response Body |
| User-Agent | N/A | Results Object |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Password | | |
| Yap-Results-Receipt | | |
| Yap-Results-Timeout | | |

FIG. 18

Returns: an XML Hierarchy containing

- result—the body of result xml
- result-type
- result-code
- result-code-description
- result text
- result-is-silence
- result-details
- result-conf
- lattice

FIG. 19

TTS Header

| Request Headers | Request Body | Response Body |
|---|---|---|
| User-Agent | NA | TTS Binary Audio Data |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-TTS-String | | |
| Yap-TTS-Voice | | |

*FIG. 20*

CORRECT HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Results-Receipt | | |
| Yap-Correction | | |

*FIG. 21*

PING HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |

FIG. 22

DEBUG HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Debug-Msg | | |

FIG. 23

CONTINUOUS SPEECH TRANSCRIPTION PERFORMANCE INDICATION

I. CROSS REFERENCE TO RELATED APPLICATIONS

This application is a continuation of U.S. application Ser. No. 13/621,179, filed Sep. 15, 2012, which is a continuation of U.S. application Ser. No. 12/197,213, filed on Aug. 22, 2008, now U.S. Pat. No. 8,510,109, which claims the benefit of priority from:

(1) U.S. provisional patent application Ser. No. 60/957,386, filed Aug. 22, 2007 and entitled "CONTINUOUS SPEECH TRANSCRIPTION PERFORMANCE INDICATION;"

(2) U.S. provisional patent application Ser. No. 60/957,393, filed Aug. 22, 2007 and entitled "VOICE CLICK FOR SPEECH-ENABLED APPLICATIONS;"

(3) U.S. provisional patent application Ser. No. 60/957,701, filed Aug. 23, 2007 and entitled "CONTINUOUS SPEECH TRANSCRIPTION PERFORMANCE INDICATION;"

(4) U.S. provisional patent application Ser. No. 60/957,702, filed Aug. 23, 2007 and entitled "VOICE CLICK FOR SPEECH-ENABLED APPLICATIONS;"

(5) U.S. provisional patent application Ser. No. 60/957,706, filed Aug. 23, 2007 and entitled "POST-PROCESSING TRANSCRIPTION RESULTS WITH FILTERS AND FINITE GRAMMARS;"

(6) U.S. provisional patent application Ser. No. 60/972,851, filed Sep. 17, 2007 and entitled "SYSTEM AND METHOD FOR DELIVERING MOBILE ADVERTISING WITHIN A THREADED SMS OR IM CHAT CONVERSATION ON A MOBILE DEVICE CLIENT;"

(7) U.S. provisional patent application Ser. No. 60/972,853, filed Sep. 17, 2007 and entitled "METHOD AND SYSTEM FOR DYNAMIC PERSONALIZATION AND QUERYING OF USER PROFILES BASED ON SMS/IM CHAT MESSAGING ON A MOBILE DEVICE;"

(8) U.S. provisional patent application Ser. No. 60/972,854, filed Sep. 17, 2007 and entitled "LOCATION, TIME & SEASON AWARE MOBILE ADVERTISING DELIVERY;"

(9) U.S. provisional patent application Ser. No. 60/972,936, filed Sep. 17, 2007 and entitled "DELIVERING TARGETED ADVERTISING TO MOBILE DEVICE FOR PRESENTATION WITHIN SMSes OR IM CONVERSATIONS;"

(10) U.S. provisional patent application Ser. No. 60/972,943, filed Sep. 17, 2007 and entitled "Dynamic Personalization and Querying of User Profiles Based on SMSes and IM Conversations;"

(11) U.S. provisional patent application Ser. No. 60/972,944, filed Sep. 17, 2007 and entitled "Location, Time, and Season Aware Advertising Delivery to and Presentation on Mobile Device Within SMSes or IM Conversations or User Interface Thereof;"

(12) U.S. provisional patent application Ser. No. 61/016,586, filed Dec. 25, 2007 and entitled "VALIDATION OF MOBILE ADVERTISING FROM DERIVED INFORMATION,"

(13) U.S. provisional patent application Ser. No. 61/021,335, filed Jan. 16, 2008 and entitled "USING A PHYSICAL PHENOMENA DETECTOR TO START AND STOP RECORDING FOR A SPEECH RECOGNITION ENGINE,"

(14) U.S. provisional patent application Ser. No. 61/021,341, filed Jan. 16, 2008 and entitled "CONTINUOUS SPEECH TRANSCRIPTION UTTERANCE EMPHASIS AND SILENCE INDICATION;"

(15) U.S. provisional patent application Ser. No. 61/034,815, filed Mar. 7, 2008 and entitled "USE OF INTERMEDIATE SPEECH TRANSCRIPTION RESULTS IN EDITING FINAL SPEECH TRANSCRIPTION RESULTS;"

(16) U.S. provisional patent application Ser. No. 61/038,046, filed Mar. 19, 2008 and entitled "CORRECTIVE FEEDBACK LOOP FOR AUTOMATED SPEECH RECOGNITION;"

(17) U.S. provisional patent application Ser. No. 61/041,219, filed Mar. 31, 2008 and entitled "USE OF METADATA TO POST PROCESS SPEECH RECOGNITION OUTPUT."

Each of the foregoing are incorporated by reference in their entireties herein.

Additionally, the disclosure of U.S. patent application Ser. No. 11/697,074, filed Apr. 5, 2007, entitled "HOSTED VOICE RECOGNITION SYSTEM FOR WIRELESS DEVICES" and published as U.S. Patent Application Pub. No. US 2007/0239837, is incorporated in its entirety herein by reference and is intended to provide background and technical information with regard to the systems and environments of the inventions of the current provisional patent application.

Further, the foregoing nonprovisional patent application references and incorporates a previously filed provisional patent application (U.S. Provisional Patent Application Ser. No. 60/789,837, filed Apr. 5, 2006, entitled "Apparatus And Method For Converting Human Speech Into A Text Or Email Message In A Mobile Environment Using Grammar Or Transcription Based Speech Recognition Software Which Optionally Resides On The Internet," by Victor R. Jablokov, which is incorporated in its entirety herein by reference). The disclosure of this particular provisional patent application is contained in Appendix A attached hereto and, likewise, is incorporated herein in its entirety by reference and is intended to provide background and technical information with regard to the systems and environments of the inventions of the current provisional patent application.

Still further, the disclosure of U.S. provisional patent application Ser. No. 61/091,330, filed Aug. 22, 2008 and entitled "METHODS, APPARATUSES, AND SYSTEMS FOR PROVIDING TIMELY USER CUES PERTAINING TO SPEECH RECOGNITION," is incorporated herein in its entirety by reference.

Finally, a brochure espousing benefits of one or more inventions of the present patent application as well as these prior filed applications is contained in Appendix B attached hereto. The disclosure of this brochure further is incorporated herein in its entirety by reference.

II. COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the governmental files or records, but otherwise reserves all copyright rights whatsoever.

III. BACKGROUND OF THE PRESENT INVENTION

Automatic Speech Recognition ("ASR") systems convert spoken audio into text. As used herein, the term "speech recognition" refers to the process of converting a speech (audio) signal to a sequence of words or a representation thereof (text messages), by means of an algorithm implemented as a computer program. Speech recognition applications that have emerged over the last few years include voice dialing (e.g., "Call home"), call routing (e.g., "I would like to make a collect call"), simple data entry (e.g., entering a credit card number), preparation of structured documents (e.g., a radiology report), and content-based spoken audio searching (e.g. finding a podcast where particular words were spoken).

As their accuracy has improved, ASR systems have become commonplace in recent years. For example, ASR systems have found wide application in customer service centers of companies. The customer service centers offer middleware and solutions for contact centers. For example, they answer and route calls to decrease costs for airlines, banks, etc. In order to accomplish this, companies such as IBM and Nuance create assets known as IVR (Interactive Voice Response) that answer the calls, then use ASR (Automatic Speech Recognition) paired with TTS (Text-To-Speech) software to decode what the caller is saying and communicate back to them.

More recently, ASR systems have found application with regard to text messaging. Text messaging usually involves the input of a text message by a sender who presses letters and/or numbers associated with the sender's mobile phone. As recognized for example in the aforementioned, commonly-assigned U.S. patent application Ser. No. 11/697,074, it can be advantageous to make text messaging far easier for an end user by allowing the user to dictate his or her message rather than requiring the user to type it into his or her phones. In certain circumstances, such as when a user is driving a vehicle, typing a text message may not be possible and/or convenient, and may even be unsafe. On the other hand, text messages can be advantageous to a message receiver as compared to voicemail, as the receiver actually sees the message content in a written format rather than having to rely on an auditory signal.

Many other applications for speech recognition and ASR systems will be recognized as well.

Of course, the usefulness of an ASR system is generally only as good as its speech recognition accuracy. Recognition accuracy for a particular utterance can vary based on many factors including the audio fidelity of the recorded speech, correctness of the speaker's pronunciation, and the like. The contribution of these factors to a recognition failure is complex and may not be obvious to an ASR system user when a transcription error occurs. The only indication that an error has occurred may be the resulting (incorrect) transcription text.

Some ASR systems are able to provide an indication of confidence the transcription performance. The confidence might be expressed as a number, such as a percentage on a scale of 0% to 100%. In addition, an indication of interference (background noise, etc) may be given. However, known systems do not provide an approach whereby transcription metrics, such as metrics relating to confidence or interference, can be communicated to the user of an ASR system by graphical or audio integration into the results of the transcription, while minimizing user interface clutter and distraction.

Additionally, when speech is transcribed to text, some natural speech elements can be lost during the transcription process. Specifically, verbal volume, or emphasis, as well as pauses between words and phrases, are difficult to render within a language model. Known systems do not provide an approach for at least partially compensating for these shortcomings by recreating these missing elements as visual cues.

IV. SUMMARY OF THE INVENTION

The present invention includes many aspects and features. Moreover, while many aspects and features relate to, and are described in, the context of <Again, Insert the General Field of the Invention>, the present invention is not limited to use only in <Again, Insert the General Field of the Invention>, as will become apparent from the following summaries and detailed descriptions of aspects, features, and one or more embodiments of the present invention.

Accordingly, one aspect of the present invention relates to a method of providing speech transcription performance indication. The method includes displaying, by a user device, text transcribed from an audio stream by an ASR system; and via the user device, providing, in user-perceptible form, an indicator of a level of background noise of the audio stream.

In a feature of this aspect of the invention, the method further includes, before the displaying step, receiving, by the user device, the transcribed text from the ASR system.

Another aspect of the present invention relates to a method of providing speech transcription performance indication. The method includes receiving, at a user device data representing text transcribed from an audio stream by an ASR system, and data representing a metric associated with the audio stream; displaying, via the user device, said text; and via the user device, providing, in user-perceptible form, an indicator of said metric.

In a feature of this aspect of the invention, said transcribed text was converted at a server from data representing said audio stream transmitted to the server from a transmitting device.

In a feature of this aspect of the invention, said transcribed text was confirmed by a user of said transmitting device prior to said receiving step.

In a feature of this aspect of the invention, said transcribed text was confirmed prior to said receiving step.

In a feature of this aspect of the invention, said text comprises a word and said metric is a metric of said word.

In a feature of this aspect of the invention, said text comprises a plurality of words and said metric is one of a plurality of metrics represented by data received at the user device and provided via the user device, each of said plurality of metrics being a metric of a distinct one of said plurality of words.

In a feature of this aspect of the invention, said text comprises a syllable and said metric is a metric of said syllable.

In a feature of this aspect of the invention, said text comprises a plurality of syllables and said metric is one of a plurality of metrics represented by data received at the user device and provided via the user device, each of said plurality of metrics being a metric of a distinct one of said plurality of syllables.

In a feature of this aspect of the invention, said text comprises a phrase and said metric is a metric of said phrase.

In a feature of this aspect of the invention, said text comprises a plurality of phrases and said metric is one of a plurality of metrics represented by data received at the user device and provided via the user device, each of said plurality of metrics being a metric of a distinct one of said plurality of phrases.

In a feature of this aspect of the invention, said text comprises a sentence and said metric is a metric of said sentence.

In a feature of this aspect of the invention, said text comprises a plurality of sentences and said metric is one of a plurality of metrics represented by data received at the user device and provided via the user device, each of said plurality of metrics being a metric of a distinct one of said plurality of sentences.

In a feature of this aspect of the invention, said text comprises a plurality of units and said metric is one of a plurality of metrics represented by data received at the user device and provided via the user device, each of said plurality of metrics being a metric of one of said plurality of units, and each of said units being either a word, a sentence, a phrase, or a syllable.

In a feature of this aspect of the invention, said user device is a mobile phone.

In a feature of this aspect of the invention, said data representing transcribed text and said data representing said metric are received in the same manner as data representing a text message.

In a feature of this aspect of the invention, said text is displayed as a text message.

In a feature of this aspect of the invention, said user device is a computer.

In a feature of this aspect of the invention, said data representing transcribed text and said data representing said metric are received in the same manner as data representing an instant message.

In a feature of this aspect of the invention, said text is displayed as an instant message.

In a feature of this aspect of the invention, said data representing transcribed text and said data representing said metric are received in the same manner as data representing an email.

In a feature of this aspect of the invention, said text is displayed as an email.

In a feature of this aspect of the invention, said metric associated with the audio stream comprises a volume of the audio stream.

In a feature of this aspect of the invention, said metric associated with the audio stream comprises background noise of the audio stream.

In a feature of this aspect of the invention, said metric associated with the audio stream comprises a confidence level of the audio stream.

In a feature of this aspect of the invention, said indicator comprises a font color.

In a feature of this aspect of the invention, said indicator comprises a font weight.

In a feature of this aspect of the invention, said indicator comprises a font size.

In a feature of this aspect of the invention, said indicator comprises underlining.

In a feature of this aspect of the invention, said indicator comprises an audible indicator.

Another aspect of the present invention relates to a method of providing speech transcription performance indication. The method includes receiving data representing an audio stream; converting said data representing an audio stream to text via an ASR system; determining a metric associated with the audio stream; transmitting data representing said text to a user device; and transmitting data representing said metric to the user device.

In addition to the aforementioned aspects and features of the present invention, it should be noted that the present invention further encompasses the various possible combinations and subcombinations of such aspects and features.

V. BRIEF DESCRIPTION OF THE DRAWINGS

Further aspects, features, embodiments, and advantages of the present invention will become apparent from the following detailed description with reference to the drawings, wherein:

FIG. 14 is a typical header section of an HTTP request from the client in the commercial implementation;

FIG. 15 illustrates exemplary protocol details for a request for a location of a login server and a subsequent response;

FIG. 16 illustrates exemplary protocol details for a login request and a subsequent response;

FIG. 17 illustrates exemplary protocol details for a submit request and a subsequent response;

FIG. 18 illustrates exemplary protocol details for a results request and a subsequent response;

FIG. 19 illustrates exemplary protocol details for an XML hierarchy returned in response to a results request;

FIG. 20 illustrates exemplary protocol details for a text to speech request and a subsequent response;

FIG. 21 illustrates exemplary protocol details for a correct request;

FIG. 22 illustrates exemplary protocol details for a ping request; and

FIG. 23 illustrates exemplary protocol details for a debug request.

VI. DETAILED DESCRIPTION OF THE PREFERRED EMBODIMENTS

Figure 1:
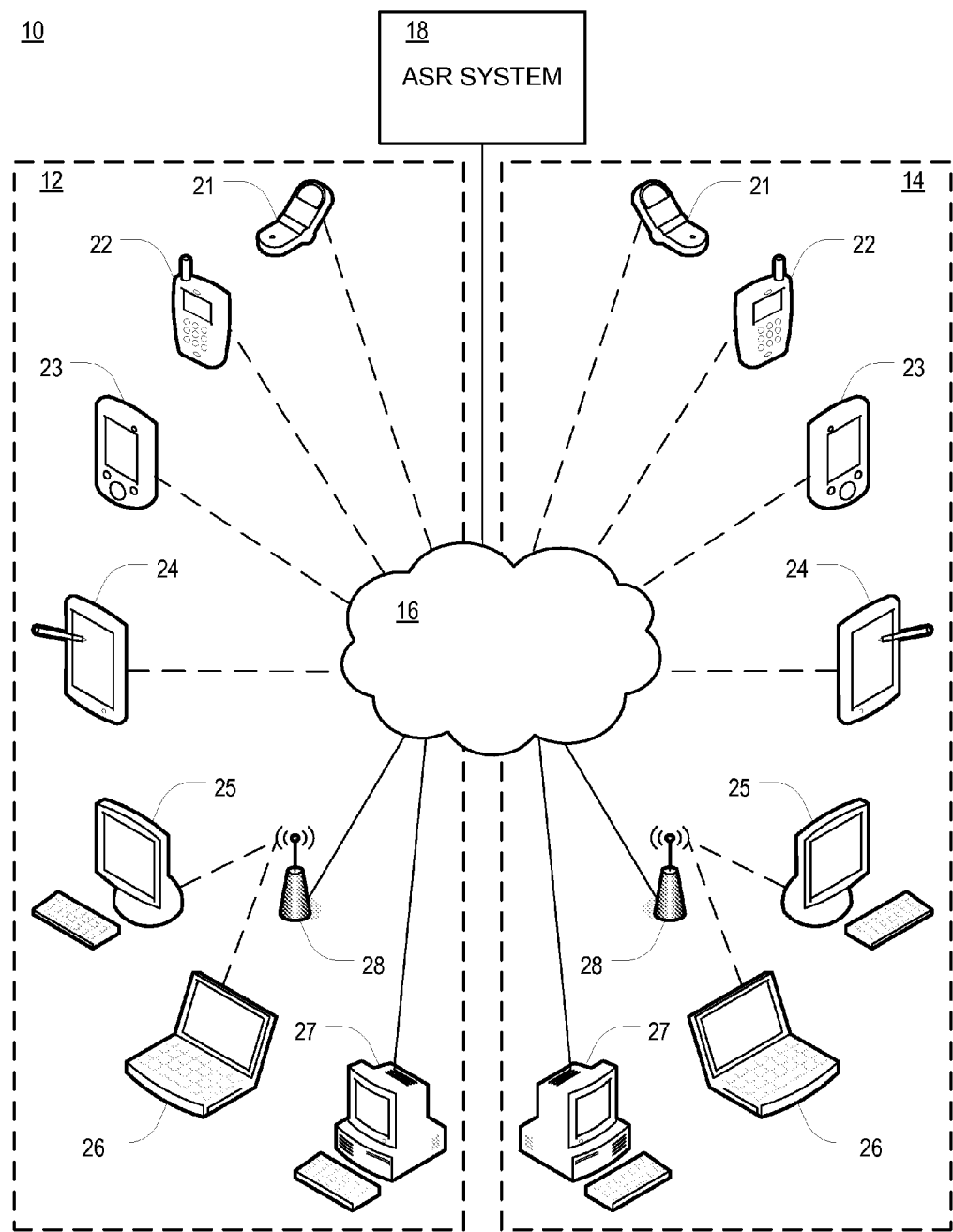
FIG. 1 is a block diagram of a communication system in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a block diagram of a communication system 10 in accordance with a preferred embodiment of the present invention. As shown therein, the communication system 10 includes at least one transmitting device 12 and at least one receiving device 14, one or more network systems 16 for connecting the transmitting device 12 to the receiving device 14, and an ASR system 18, including an ASR engine. Transmitting and receiving devices 12,14 may include cell phones 21, smart phones 22, PDAs 23, tablet notebooks 24, various desktop and laptop computers 25,26,27, and the like. One or more of the devices 12,14, such as the illustrated iMac and laptop computers 25,26, may connect to the network systems 16 via wireless access point 28. The various transmitting and receiving devices 12,14 (one or both types of which being sometimes referred to herein as "client devices") may be of any conventional design and manufacture.

Figure 2:
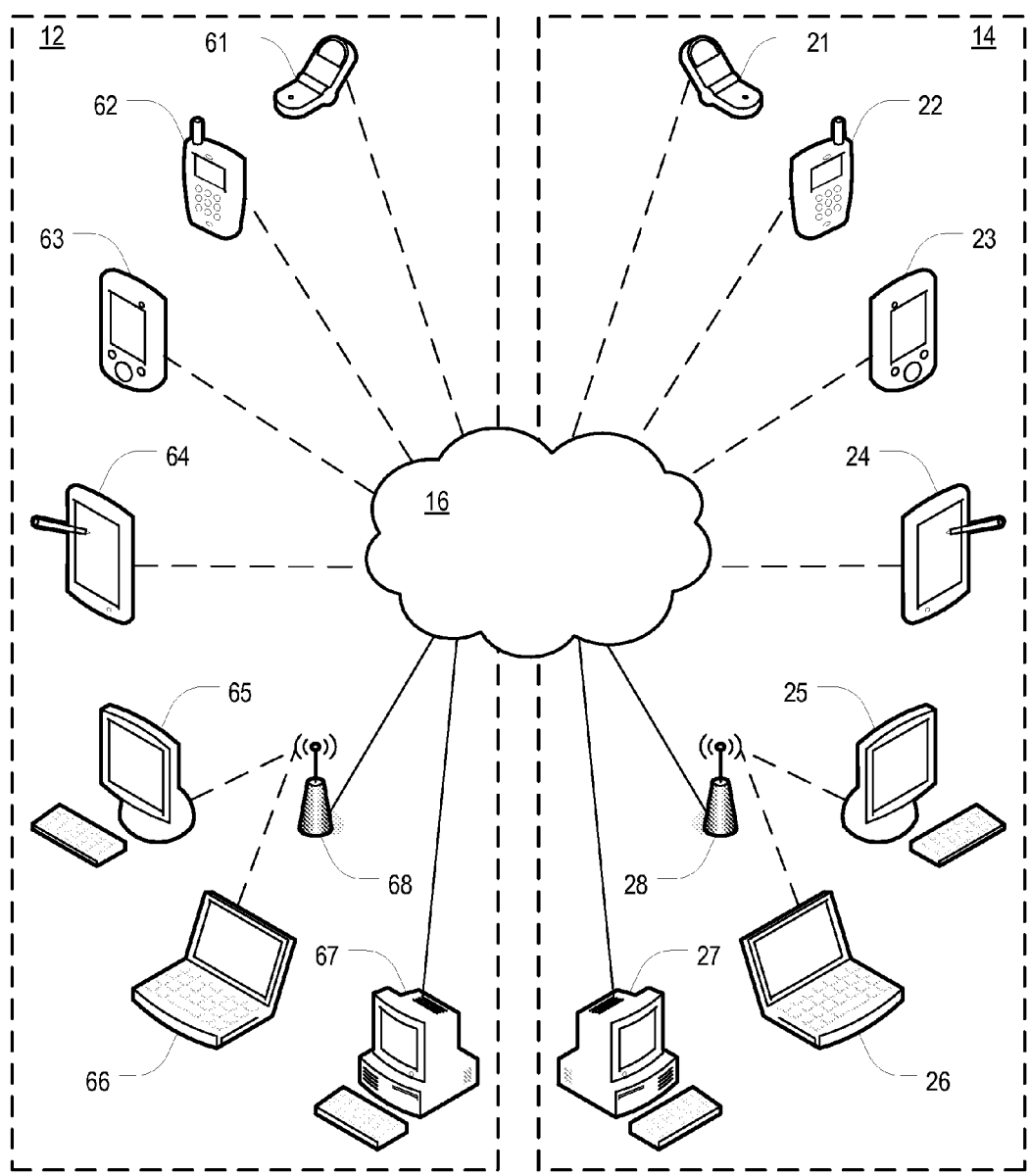
FIG. 2 is a block diagram of a communication system in accordance with another preferred embodiment of the present invention.

FIG. 2 is a block diagram of a communication system 60 in accordance with another preferred embodiment of the present invention. This system 60 is similar to the system 10 of FIG. 1, except that the ASR system 18 of FIG. 1 has been omitted and the ASR engine has instead been incorporated into the various transmitting devices 12, including cell phones 61, smart phones 62, PDAs 63, tablet notebooks 64, various desktop and laptop computers 65,66,67, and the like.

It will be appreciated that the illustrations of FIGS. 1 and 2 are intended primarily to provide context in which the inventive features of the present invention may be placed. A more complete explanation of one or more system architectures implementing such systems is provided elsewhere herein, in the incorporated applications and/or in the incorporated Appendices attached hereto. Furthermore, in the context of text messaging, the communication systems 10,60 each preferably includes, inter alia, a telecommunications network. In the context of instant messaging, the communications systems 10,60 each preferably includes, inter alia, the Internet.

Figure 3:
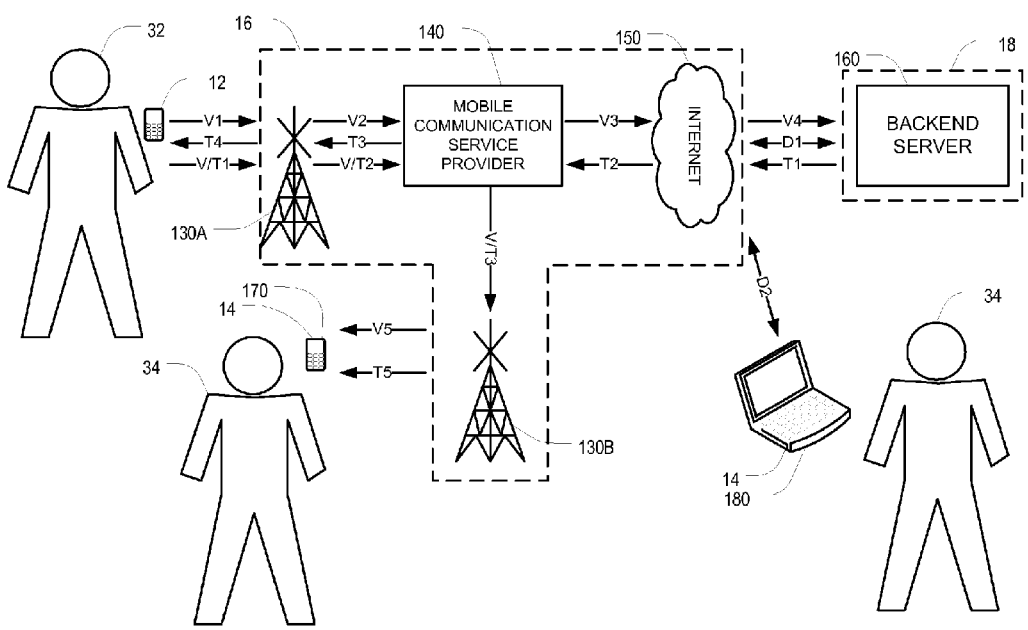
FIG. 3 is a block diagram of an exemplary implementation of the system of FIG. 1.

More particularly, and as described, for example, in the aforementioned U.S. Patent Application Pub. No. US 2007/0239837, FIG. 3 is a block diagram of an exemplary implementation of the system 10 of FIG. 1. In this implementation, the transmitting device 12 is a mobile phone, the ASR system 18 is implemented in one or more backend servers 160, and the one or more network systems 16 include transceiver towers 130, one or more mobile communication service providers 140 (operating or joint or independent control) and the Internet 150. The backend server 160 is or may be placed in communication with the mobile phone 12 via the mobile communication service provider 140 and the Internet 150. The mobile phone has a microphone, a speaker and a display.

A first transceiver tower 130A is positioned between the mobile phone 12 (or the user 32 of the mobile phone 12) and the mobile communication service provider 140, for receiving an audio message (V1), a text message (T3) and/or a verified text message (V/T1) from one of the mobile phone 12 and the mobile communication service provider 140 and transmitting it (V2, T4, V/T2) to the other of the mobile phone 12 and the mobile communication service provider 140. A second transceiver tower 130B is positioned between the mobile communication service provider 140 and mobile devices 170, generally defined as receiving devices 14 equipped to communicate wirelessly via mobile communication service provider 140, for receiving a verified text message (V/T3) from the mobile communication service provider 140 and transmitting it (V5 and T5) to the mobile devices 170. In at least some embodiments, the mobile devices 170 are adapted for receiving a text message converted from an audio message created in the mobile phone 12. Additionally, in at least some embodiment, the mobile devices 170 are also capable of receiving an audio message from the mobile phone 12. The mobile devices 170 include, but are not limited to, a pager, a palm PC, a mobile phone, or the like.

The system 10 also includes software, as disclosed below in more detail, installed in the mobile phone 12 and the backend server 160 for causing the mobile phone 12 and/or the backend server 160 to perform the following functions. The first step is to initialize the mobile phone 12 to establish communication between the mobile phone 12 and the backend server 160, which includes initializing a desired application from the mobile phone 12 and logging into a user account in the backend server 160 from the mobile phone 12. Then, the user 32 presses and holds one of the buttons of the mobile phone 12 and speaks an utterance, thus generating an audio message, V1. At this stage, the audio message V1 is recorded in the mobile phone 12. By releasing the button, the recorded audio message V1 is sent to the backend server 160 through the mobile communication service provider 140.

In the exemplary embodiment of the present invention as shown in FIG. 3, the recorded audio message V1 is first transmitted to the first transceiver tower 130A from the mobile phone 12. The first transceiver tower 130A outputs the audio message V1 into an audio message V2 that is, in turn, transmitted to the mobile communication service provider 140. Then the mobile communication service provider 140 outputs the audio message V2 into an audio message V3 and transmits it (V3) to the Internet 150. The Internet 150 outputs the audio message V3 into an audio message V4 and transmits it (V4) to the backend server 160. The content of all the audio messages V1-V4 is identical.

The backend server 160 then converts the audio message V4 into a text message, T1, and/or a digital signal, D1, in the backend server 160 by means of a speech recognition algorithm including a grammar algorithm and/or a transcription algorithm. The text message T1 and the digital signal D1 correspond to two different formats of the audio message V4. The text message T1 and/or the digital signal D1 are sent back to the Internet 150 that outputs them into a text message T2 and a digital signal D2, respectively.

The digital signal D2 is transmitted to a digital receiver 180, generally defined as a receiving device 14 equipped to communicate with the Internet and capable of receiving the digital signal D2. In at least some embodiments, the digital receiver 180 is adapted for receiving a digital signal converted from an audio message created in the mobile phone 12. Additionally, in at least some embodiments, the digital receiver 180 is also capable of receiving an audio message from the mobile phone 12. A conventional computer is one example of a digital receiver 180. In this context, a digital signal D2 may represent, for example, an email or instant message.

It should be understood that, depending upon the configuration of the backend server 160 and software installed on the mobile phone 12, and potentially based upon the system set up or preferences of the user 32, the digital signal D2 can either be transmitted directly from the backend server 160 or it can be provided back to the mobile phone 12 for review and acceptance by the user 32 before it is sent on to the digital receiver 180.

The text message T2 is sent to the mobile communication service provider 140 that outputs it (T2) into a text message T3. The output text message T3 is then transmitted to the first transceiver tower 130A. The first transceiver tower 130A then transmits it (T3) to the mobile phone 12 in the form of a text message T4. It is noted that the substantive content of all the text messages T1-T4 may be identical, which are the corresponding text form of the audio messages V1-V4.

Upon receiving the text message T4, the user 32 verifies it and sends the verified text message V/T1 to the first transceiver tower 130A that in turn, transmits it to the mobile communication service provider 140 in the form of a verified text V/T2. The verified text V/T2 is transmitted to the second transceiver tower 130B in the form of a verified text V/T3 from the mobile communication service provider 140. Then, the transceiver tower 130B transmits the verified text V/T3 to the mobile devices 170.

In at least one implementation, the audio message is simultaneously transmitted to the backend server 160 from the mobile phone 12, when the user 32 speaks to the mobile phone 12. In this circumstance, it is preferred that no audio message is recorded in the mobile phone 12, although it is possible that an audio message could be both transmitted and recorded.

Such a system may be utilized to convert an audio message into a text message. In at least one implementation, this may be accomplished by first initializing a transmitting device so that the transmitting device is capable of communicating with a backend server 160. Second, a user 32 speaks to or into the client device so as to create a stream of an audio message. The audio message can be recorded and then transmitted to the backend server 160, or the audio message can be simultaneously transmitted to the backend server 160 through a client-server communication protocol. Streaming may be accomplished according to processes described elsewhere herein and, in particular, in FIG. 4, and accompanying text, of the aforementioned U.S. Patent Application Pub. No. US 2007/0239837. The transmitted audio message is converted into the text message in the backend server 160. The converted text message is then sent back to the client device 12. Upon the user's verification, the converted text message is forwarded to one or more recipients 34 and their respective receiving devices 14, where the converted text message may be displayed on the device 14. Incoming messages may be handled, for example, according to processes described elsewhere herein and, in particular, in FIG. 2, and accompanying text, of the aforementioned U.S. Patent Application Pub. No. US 2007/0239837.

Additionally, in at least one implementation, advertising messages and/or icons may be displayed on one or both types of client device 12, 14 according to keywords contained in the converted text message, wherein the keywords are associated with the advertising messages and/or icons.

Still further, in at least one implementation, one or both types of client device 12, 14 may be located through a global positioning system (GPS); and listing locations, proximate to the position of the client device 12, 14, of a target of interest may be presented in the converted text message.

Figure 4:
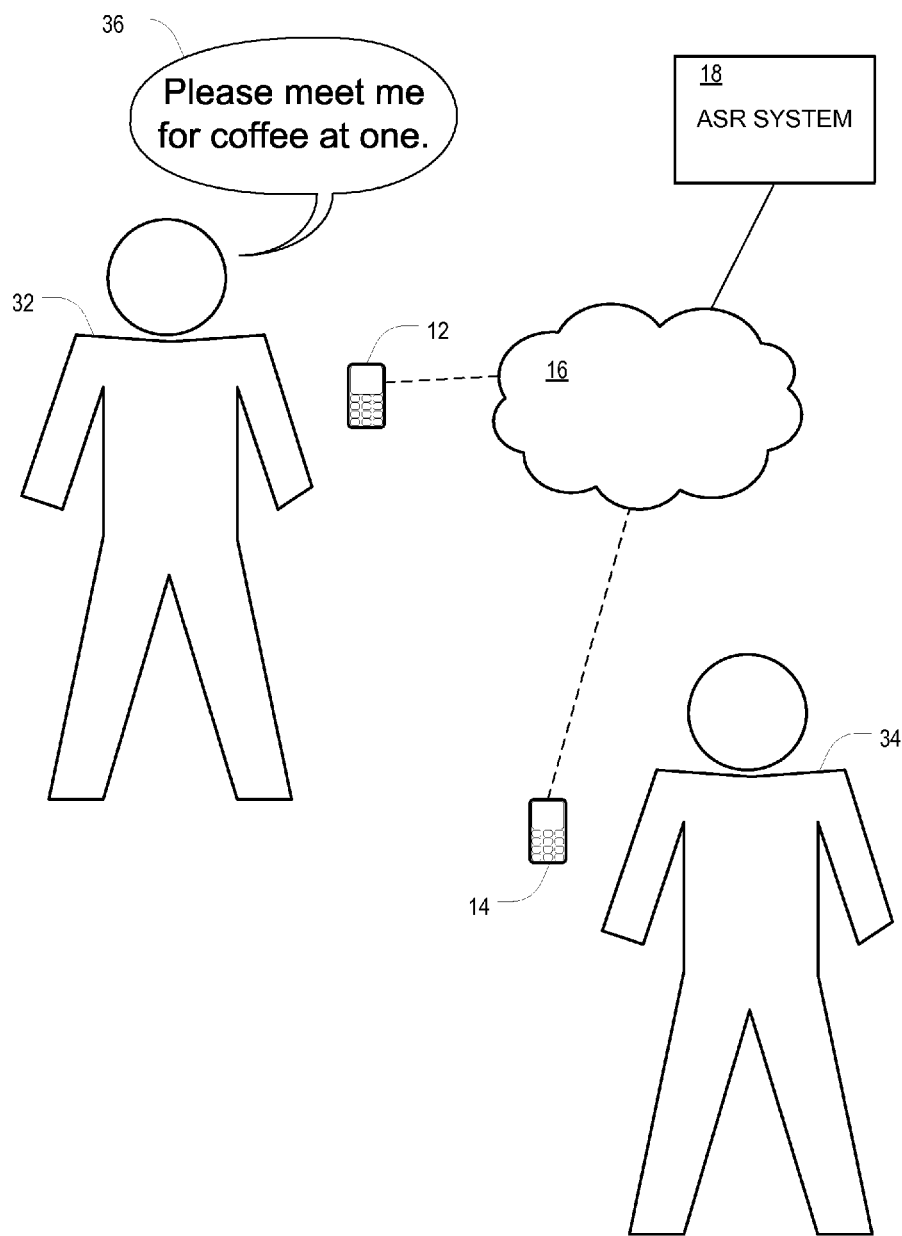
FIG. 4 is a schematic diagram illustrating the operation of continuous speech transcription performance indication in conjunction with a portion of the communication system of FIGS. 1 and 3.

FIG. 4 is a block diagram illustrating communications between two users 32, 34 via a portion of the communication system 10 of FIGS. 1 and 3. As shown therein, a first user 32, sometimes referred to herein as a transmitting user, is communicating with a second user 34, sometimes referred to herein as a receiving user, by way of respective transmitting and receiving devices 12,14. In the context of text messaging, the transmitting user 32 may send text messages using his transmitting device 12, for example via SMS, and the receiving user 34 receives text messages on his receiving device 14, in this case also via SMS. In the context of instant messaging, the transmitting user 32 may send instant messages via an IM client using his transmitting device 12, and the receiving user 34 receives instant messages on his receiving device 14 via an IM client. In either case, the transmitting user 32 preferably speaks into his transmitting device 12 with his utterances being converted to text for communicating to the receiving device 14, all as more fully described hereinbelow.

When the first user 32 speaks an utterance 36 into the transmitting device 12, and the recorded speech audio is sent to the ASR system 18, as described previously. In the example of FIG. 4, the utterance 36 is "Please meet me for coffee at one." The ASR engine in the ASR system 18 attempts to recognize and transcribe the utterance 36 into text. Speech recognition requests received by the ASR engine may be handled, for example, according to processes described elsewhere herein and, in particular, in FIG. 3, and accompanying text, of the aforementioned U.S. Patent Application Pub. No. US 2007/0239837. Further, speech recognition may be carried out, for example, according to processes described elsewhere herein and, in particular, in FIGS. 6A-6H, and accompanying text, of the aforementioned U.S. Patent Application Pub. No. US 2007/0239837.

It will be appreciated that automated transcription of recorded utterances 36 is useful in other environments and applications as well. For example, in another system (not separately illustrated), a user speaks an utterance 36 into a device as a voicemail, and the recorded speech audio is sent to the ASR system 18. Other applications to which the teachings of the present invention are applicable will be apparent to the Ordinary Artisan.

Figure 5:
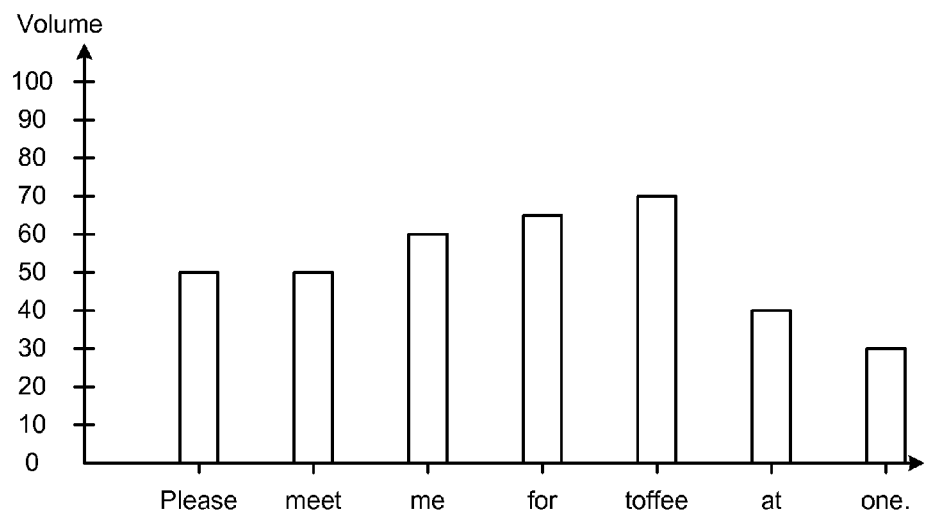
FIG. 5 is a bar graph illustrating the volume of each word in the utterance of FIG. 4.
Figure 6:
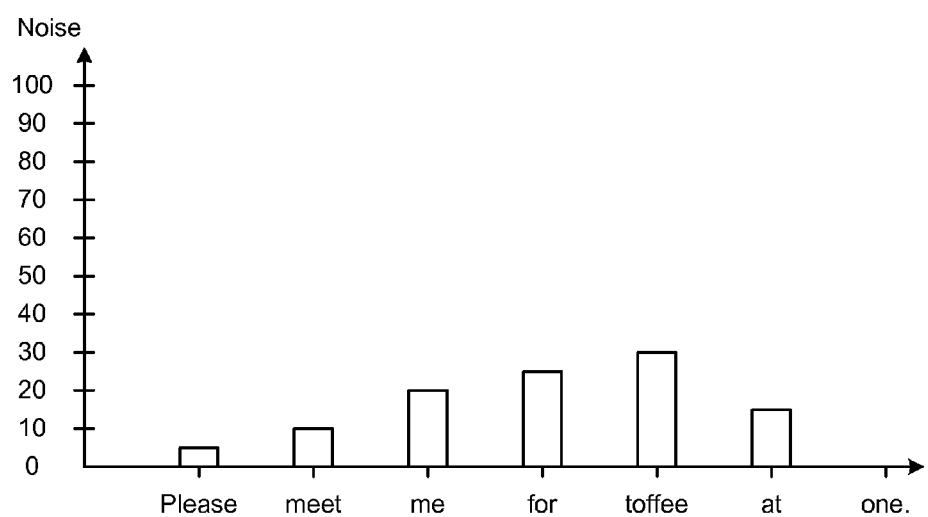
FIG. 6 is a bar graph illustrating the level of background noise present during each word in the utterance of FIG. 4.
Figures 7, 8:
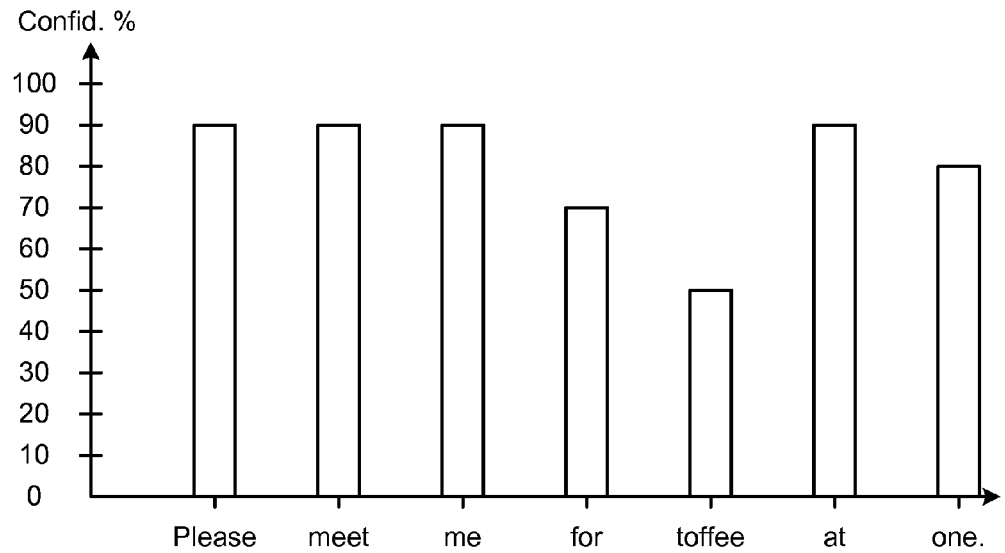
FIG. 7 is a bar graph illustrating the confidence level for each word in the utterance of FIG. 4.
FIG. 8 is an XML fragment describing the volume, background noise and confidence level for each word in the utterance of FIG. 4.

During the recording, recognition and transcription process, various parameters may be measured or otherwise determined. For example, the volume of each word in the utterance 36 may be measured, the background noise present during each word in the utterance 36 may be measured, and a confidence level (referring to the relative level of confidence the ASR system 18 has that the particular word has been converted into text properly) may be determined. In this regard, FIG. 5 is a bar graph illustrating the volume of each word in the utterance 36 of FIG. 4; FIG. 6 is a bar graph illustrating the level of background noise present during each word in the utterance 36 of FIG. 4; and FIG. 7 is a bar graph illustrating the confidence level for each word in the utterance 36 of FIG. 4. It will be appreciated that a variety of additional parameters may likewise be measured or otherwise determined, and that different combinations of parameters may be chosen.

When the ASR 18 returns the transcription results text, it also returns a stream of metrics that are linked to the text elements. The resulting parameters may be coupled with the transcribed speech on a word-by-word basis, a syllable-by-syllable basis, a phrase-by-phrase basis, a sentence-by-sentence basis, or the like, and placed into any desired format. At least some embodiments may utilize XML fragments that may be passed around as necessary. FIG. 8 is an XML fragment describing the volume, background noise and confidence level for each word in the utterance 36 of FIG. 4.

As illustrated in FIGS. 6 and 8, it will be noted that a noise spike occurred while the speaker was saying "coffee," causing the ASR 18 to mis-recognize the results as "toffee." However, the ASR 18 also noted in the results that confidence in the word "coffee" was only 50%, which was generally lower than the rest of the utterance 36. Other words in the utterance 36 were recognized correctly, but also had varying metrics levels.

If the results shown in FIGS. 5-7 are returned to the transmitting device 12 for verification by the first user 32 prior to transmission to the receiving device 14 of the second user 34, as described, for example, in FIG. 3 and accompanying text, then the first user 32 may discover the error involving "coffee" and "toffee" and may further take steps to correct the problem, such as by executing the process again (perhaps using better diction) or by manually editing the results text presented to him. However, if the first user 32 fails to discover the error before causing the message to be transmitted to the receiving device 14, if the first user 32 ignores the error, or if the message is sent directly to the receiving device 14 without first being presented to the first user 32 for verification, then the original recognition results, including the error involving "coffee" and "toffee," are provided to the receiving device 14 for presentation to the second user 34. According to the present invention, various approaches may be implemented in order to provide the second user 34 with information about the message that may aid the user 34 in assessing the likely accuracy of the message. Furthermore, other parameters pertaining to the message may likewise be provided to the receiving device 14 for presentation to the second user 34, whether or not the first user verifies, accurately or not, the results text. According to the present invention, various approaches may be implemented in order to provide the second user 34 with such additional information about the message that may aid the user 34 in better understanding or assessing the message.

Figure 9A:
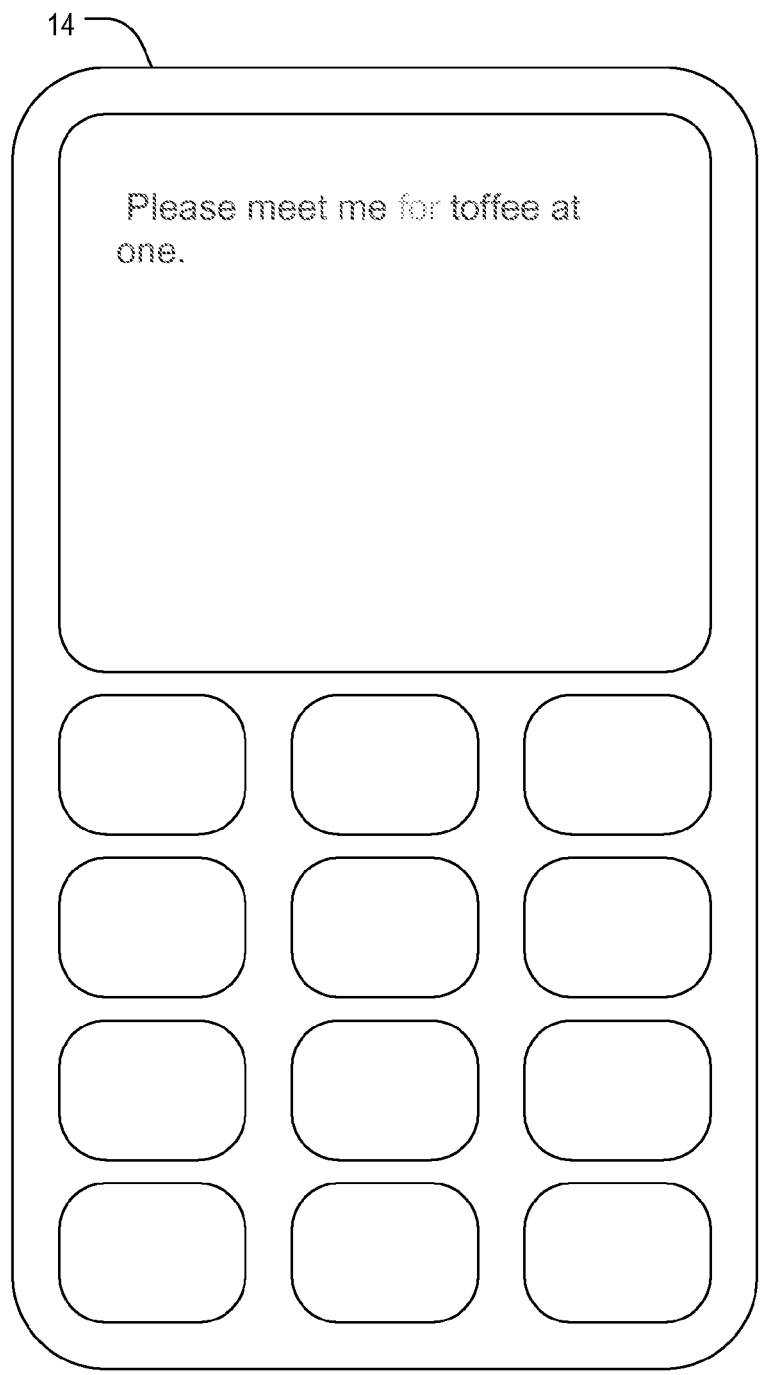
FIGS. 9A-9F are graphical depictions, on a receiving device, of the transcription of the utterance of FIG. 4 using performance indications for each word thereof.

When presenting the recognition results to the user 34 in a visual context, there are many options available to integrate ASR metrics with the results text. For example, graphical elements can be added to the textual representation of the results in several ways including, but not limited to, the use of font color, font grayscale, font weight (bold, etc.), font size, underlining, or any combination thereof. FIG. 9A is a graphical depiction, on a receiving device 14, of the transcription of the utterance 36 of FIG. 4 using font color to indicate confidence level, wherein the words "Please meet me" and "at one" appear in green to indicate a confidence level of 80-100%, the word "for" appears in orange to indicate a confidence level of 60-79%, and the word "toffee" appears in red to indicate a confidence level of 59% or below. It will be appreciated that the meaning of the various colors may be varied, greater or fewer numbers of colors may be used, different colors may be chosen, different thresholds may be chosen, or the like, all without departing from the scope of the invention.

Figure 9B:
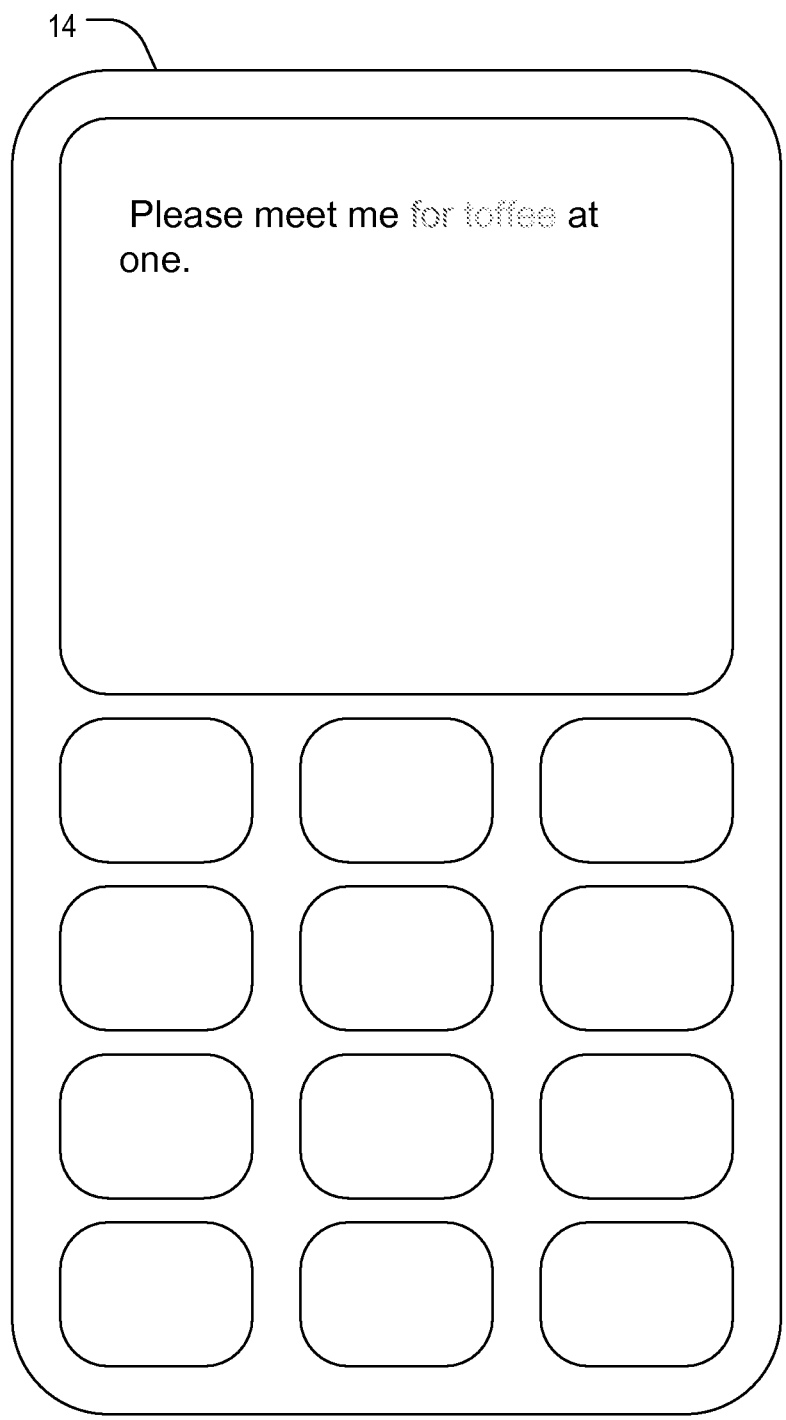

FIG. 9B is a graphical depiction, on a receiving device 14, of the transcription of the utterance 36 of FIG. 4 using font grayscale to indicate confidence level, wherein the words "Please meet me" and "at one" appear in black to indicate a confidence level of 80-100%, the word "for" appears in medium gray to indicate a confidence level of 60-79%, and the word "toffee" appears in light gray to indicate a confidence level of 59% or below. It will be appreciated that the meaning of the various shades of gray may be varied, greater or fewer numbers of shades of gray may be used, different shades of gray may be chosen, different thresholds may be chosen, or the like, all without departing from the scope of the invention.

Figure 9C:
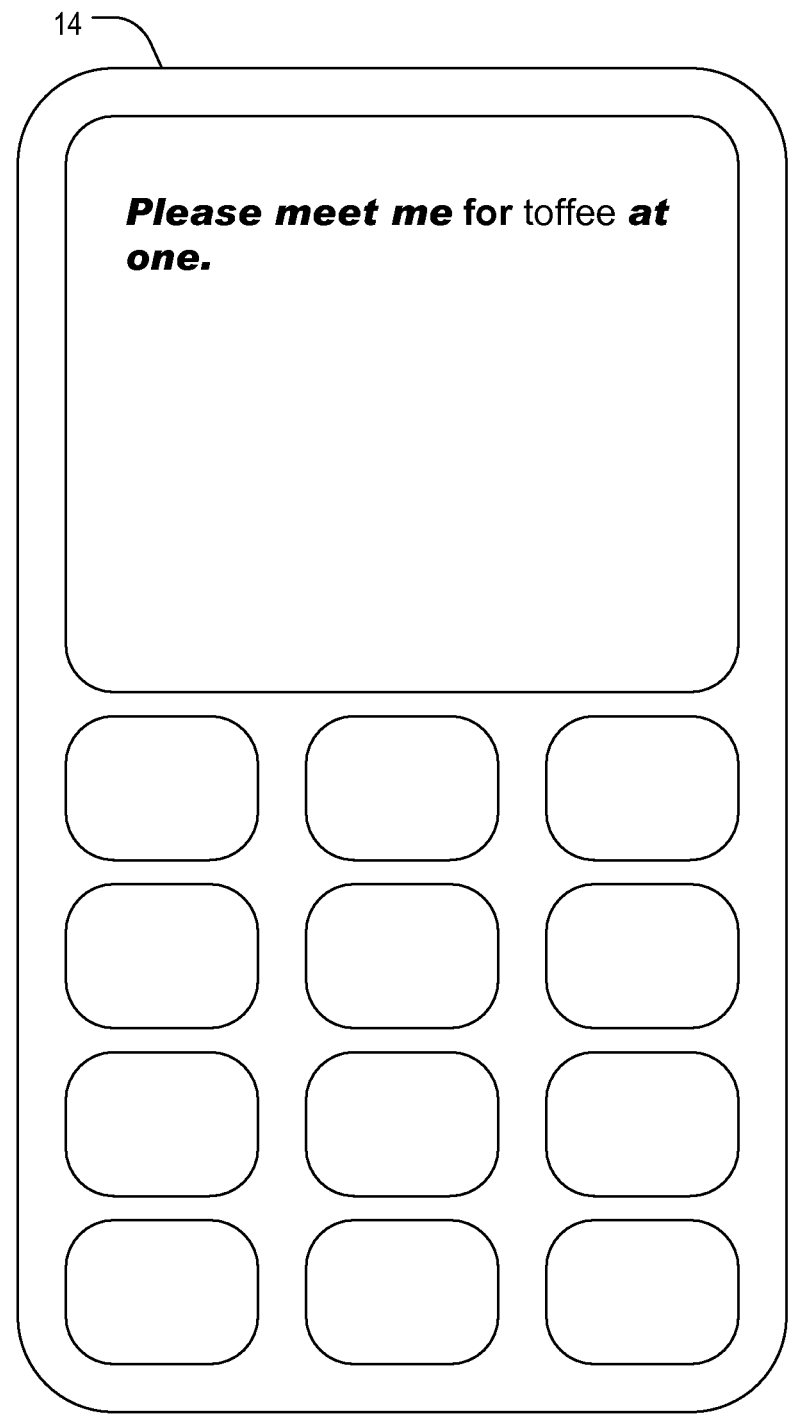

FIG. 9C is a graphical depiction, on a receiving device 14, of the transcription of the utterance 36 of FIG. 4 using font weight to indicate confidence level, wherein the words "Please meet me" and "at one" appear in double bold font to indicate a confidence level of 80-100%, the word "for"

appears in bold font to indicate a confidence level of 60-79%, and the word "toffee" appears in normal font to indicate a confidence level of 59% or below. It will be appreciated that the meaning of the various font weights may be varied, greater or fewer numbers of font weights may be used, different font weights may be chosen, different thresholds may be chosen, or the like, all without departing from the scope of the invention.

Figure 9D:
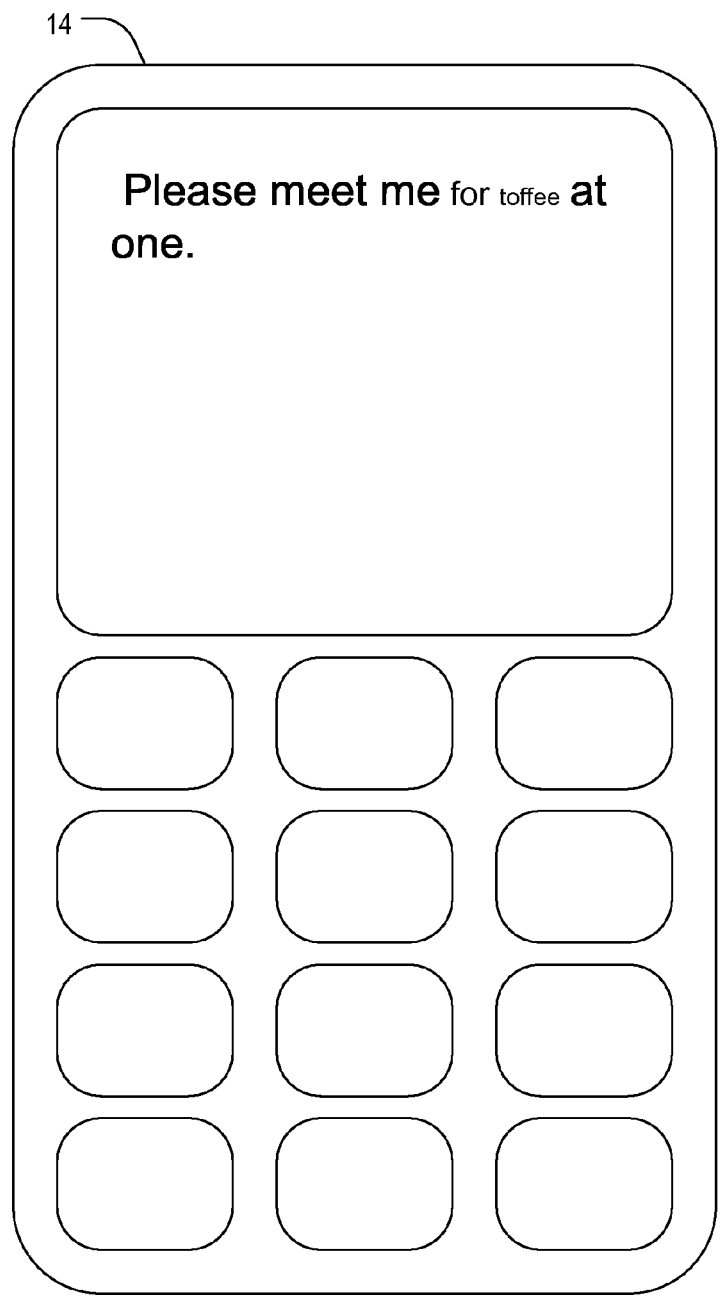

FIG. 9D is a graphical depiction, on a receiving device 14, of the transcription of the utterance 36 of FIG. 4 using font size to indicate confidence level, wherein the words "Please meet me" and "at one" appear in font size 18 to indicate a confidence level of 80-100%, the word "for" appears in font size 14 to indicate a confidence level of 60-79%, and the word "toffee" appears in font size 10 to indicate a confidence level of 59% or below. It will be appreciated that the meaning of the various font sizes may be varied, greater or fewer numbers of font sizes may be used, different font sizes may be chosen, different thresholds may be chosen, or the like, all without departing from the scope of the invention.

Figure 9E:
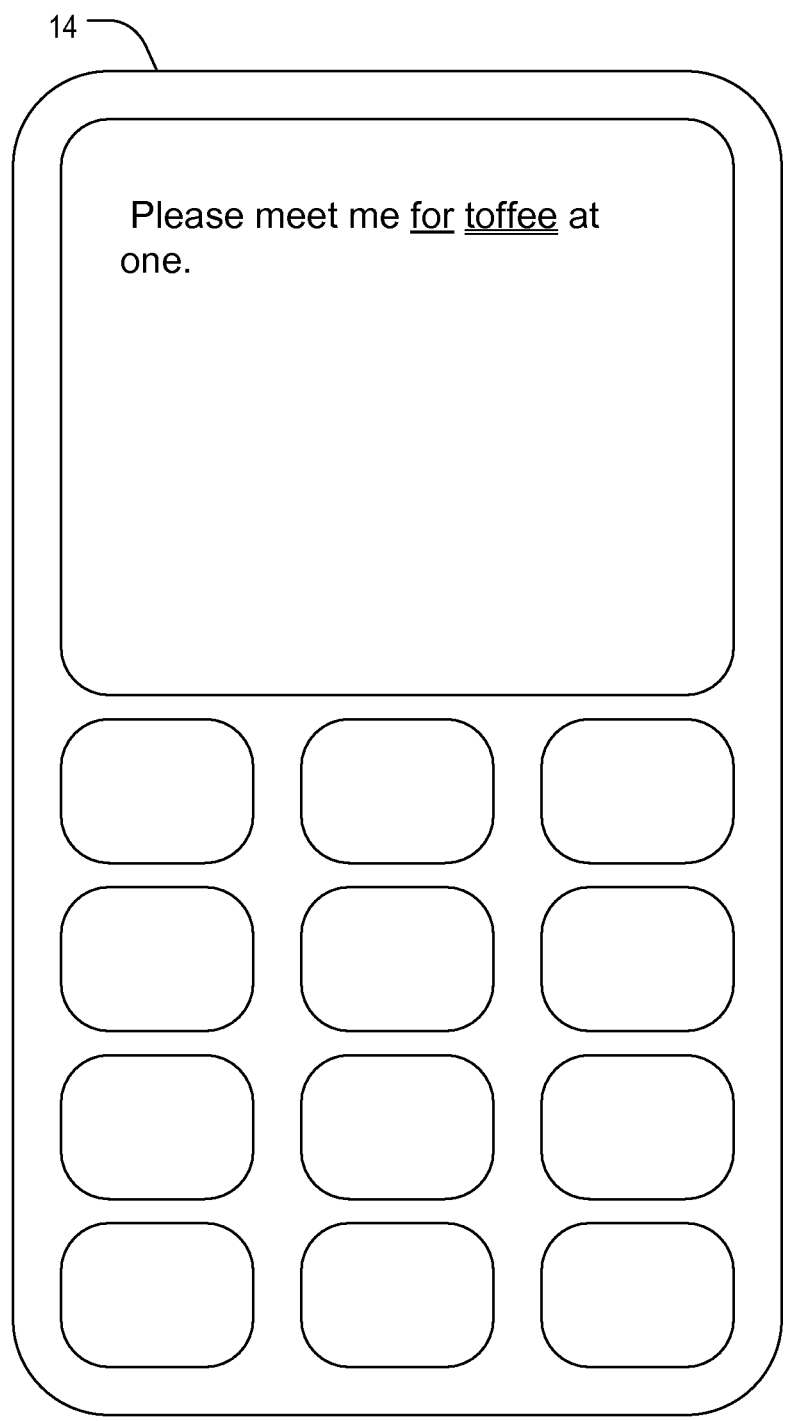

FIG. 9E is a graphical depiction, on a receiving device 14, of the transcription of the utterance 36 of FIG. 4 using underlining to indicate confidence level, wherein the words "Please meet me" and "at one" appear without underlining to indicate a confidence level of 80-100%, the word "for" is single underlined to indicate a confidence level of 60-79%, and the word "toffee" is double underlined to indicate a confidence level of 59% or below. It will be appreciated that the meaning of the various underlinings may be varied, greater or fewer numbers of underlinings may be used, different underlining styles may be chosen, different thresholds may be chosen, or the like, all without departing from the scope of the invention.

A combination of indications could be used to emphasize the various parameter levels. For example, the words "Please meet me" and "at one" could appear in black, double bold, size 18 font, without underlining, to indicate a confidence level of 80-100%, the word "for" could appear in medium gray, bold, single underlined size 14 font to indicate a confidence level of 60-79%, and the word "toffee" could appear in light gray, normal, double underlined size 10 font to indicate a confidence level of 59% or below.

Figure 9F:
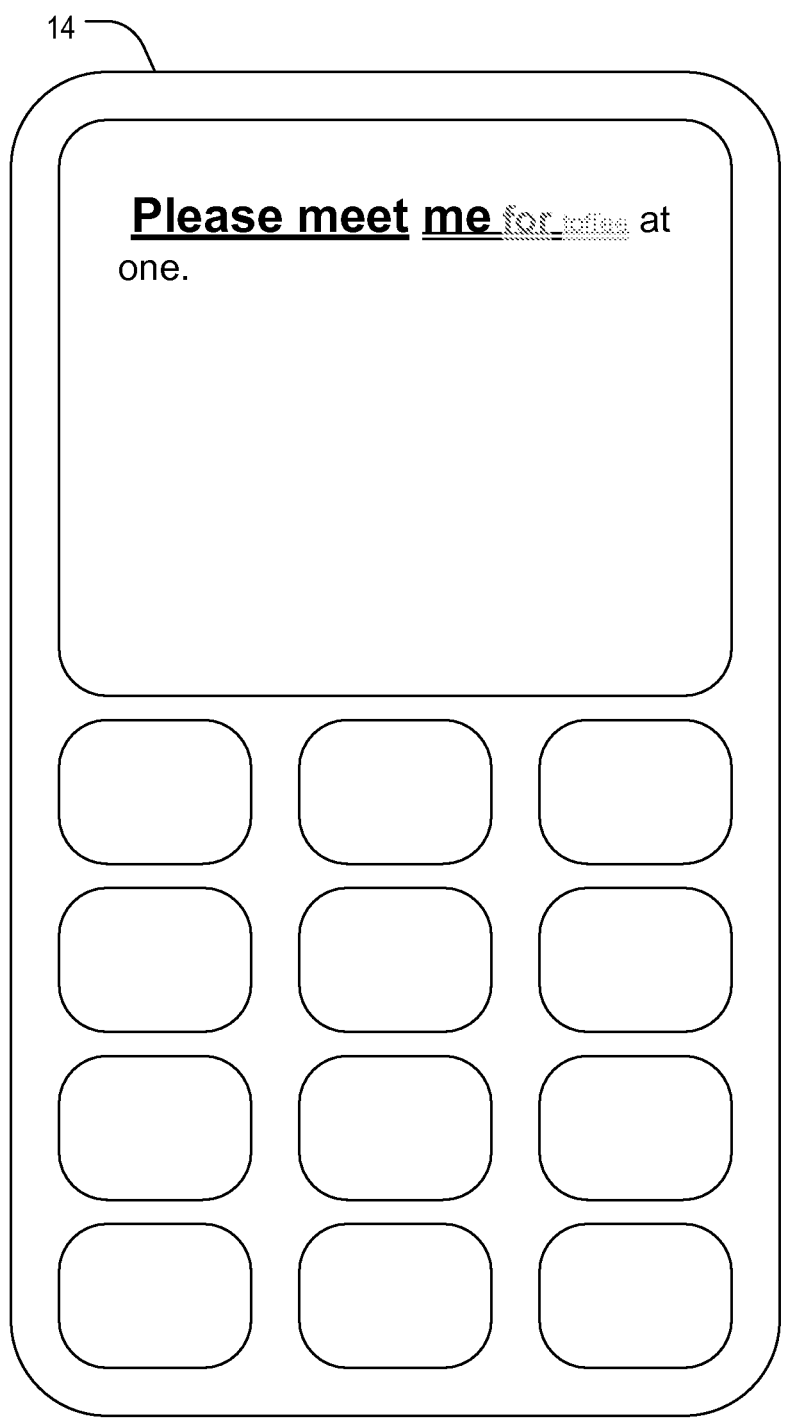

This general technique could integrate any text formatting or continuous graphical element (background, shading, color wash, texture, font type, etc) to communicate one or more ASR metrics to the receiving user 34. In addition to the variations for each indication type described previously, it will further be appreciated that any combination of different indication types may be utilized, the meaning of the various indication types may be varied, greater or fewer numbers of indication types may be used, or the like, all without departing from the scope of the invention. It will still further be appreciated that one type of indication may be used for one parameter and another type of indication may be used simultaneously for a different parameter. For example, in FIG. 9F, font color has been used to indicate confidence level, underlining style has been used to indicate utterance volume, and font size has been used to indicate utterance background noise.

Figure 10:
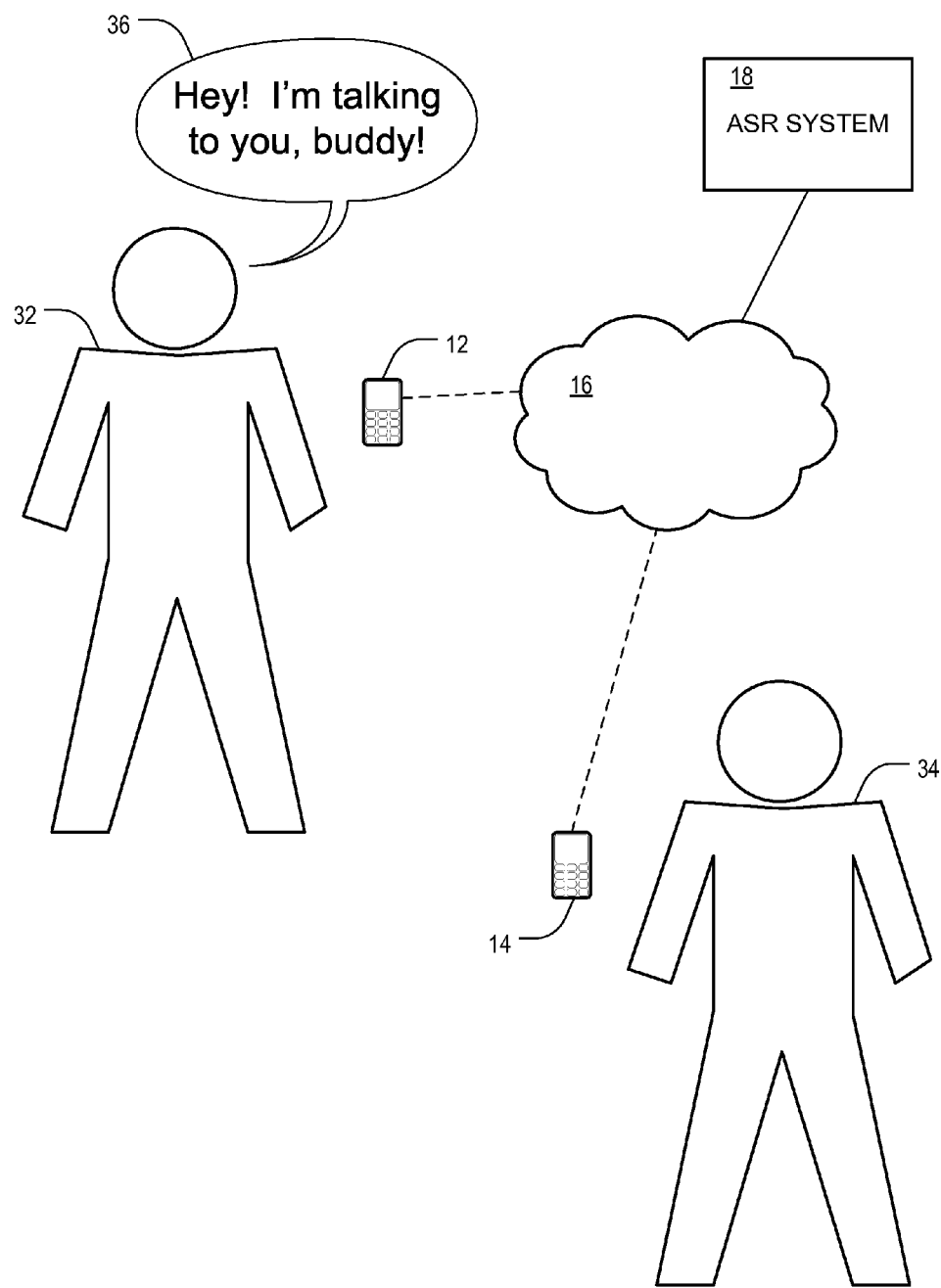
FIG. 10 is a block diagram illustrating the operation of continuous speech transcription verbal loudness or emphasis and pause or silence indication in conjunction with a portion of the communication system of FIG. 2.

A similar technique may be utilized to indicate verbal volume or emphasis and silent pauses or spaces between portions of an utterance 36. FIG. 10 is a block diagram illustrating the operation of continuous speech transcription emphasis and silence indication in conjunction with a portion of the communication system of FIG. 2. As shown therein, a first user 32 is utilizing the system 10 to communicate with a second user 34. More particularly, the user 32 speaks an utterance 36 into the transmitting device 12, and the recorded speech audio is sent to the ASR system 18. In FIG. 4, the utterance 36 is "Hey! I'm talking to you, buddy!" The ASR 18 attempts to recognize and transcribe the utterance 36 into language text.

As described previously, during the recording, recognition and transcription process, various parameters may be measured or otherwise determined. For example, the volume of each word in the utterance 36 may be measured, and the length of silent spaces or pauses between the words may be measured. In this regard, Table 1 (hereinbelow) illustrates the volume of each word in the utterance and the duration of each silent period between words. It will be appreciated that a variety of additional parameters, some of which may be described herein, may likewise be measured or otherwise determined, and that different combinations of parameters may be chosen.

As noted previously, when the ASR 18 returns the transcription results text, it also returns a stream of metrics that are linked to the text elements. As described previously with regard to the confidence level parameter, parameters such as volume and background noise may be coupled with the transcribed speech on a word-by-word basis, a syllable-by-syllable basis, a phrase-by-phrase basis, a sentence-by-sentence basis, or the like, and placed into any desired format. As also described previously with regard to the confidence level parameter, at least some embodiments may utilize XML fragments that may be passed around as necessary.

As with the performance indication described above, it is also possible to use graphical display elements to visually express speech elements such as punctuation. For example, pauses in the English language can be displayed as a space of variable length between words, and verbal emphasis, which would conventionally be shown in other text-based communication contexts by an exclamation point or the use of bolded text, can be displayed graphically using font size, boldness, or any of the other elements described for transcription metrics.

Figure 11:
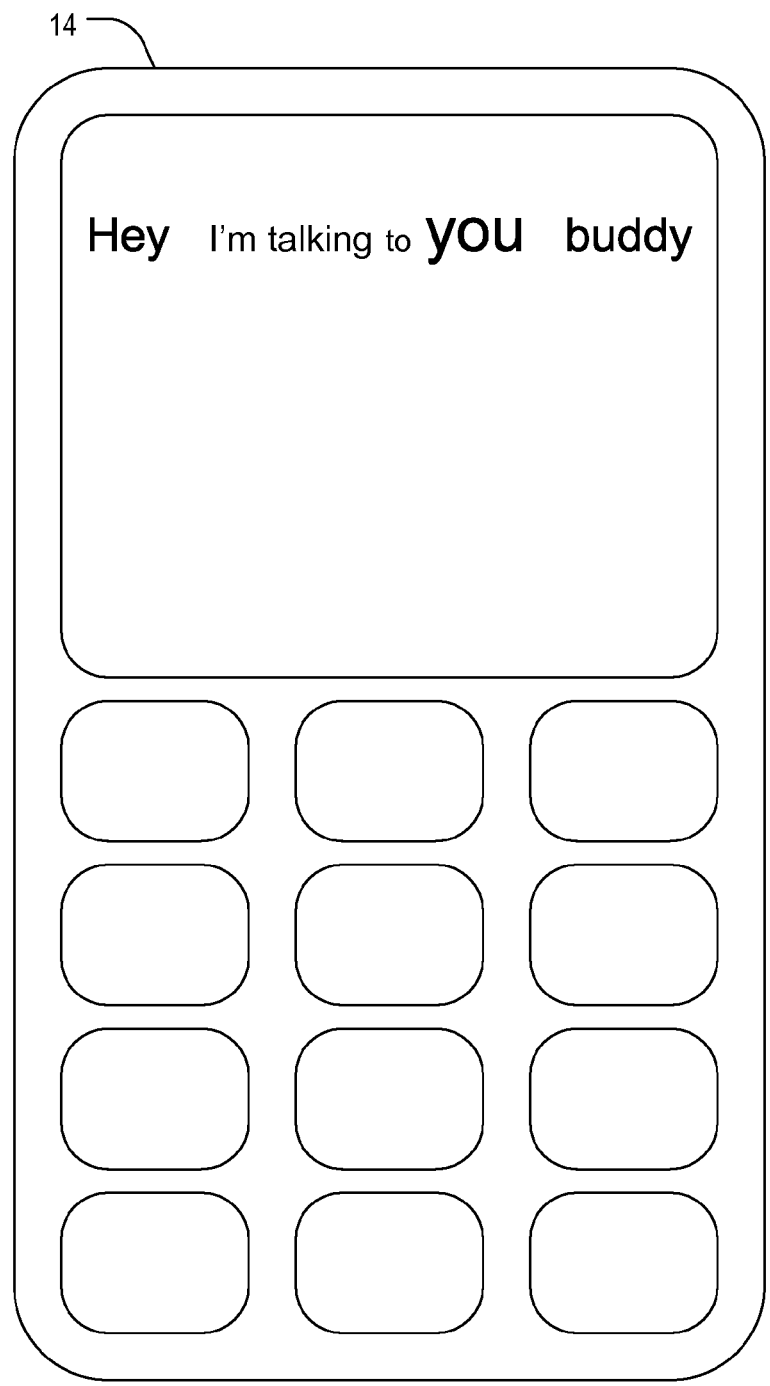
FIG. 11 is a graphical depiction, on a receiving device, of the transcription of the utterance of FIG. 10 using font size and spacing to indicate emphasis and silent spaces between portions of the utterance.

FIG. 11 is a graphical depiction, on a receiving device, of the transcription of the utterance of FIG. 10 using font size and spacing to indicate emphasis and silent spaces between portions of the utterance 36, wherein the word "you" appears in font size 24 to indicate a volume of "very loud," the words "Hey" and "buddy" appear in font size 18 to indicate a volume of "loud," the words "I'm talking" appear in font size 14 to indicate a volume of "medium" and the word "to" appears in font size 12 to indicate a volume of "quiet." Furthermore, the words "Hey" and "I'm" are separated by several spaces to indicate a long pause therebetween, and the words "I'm" and "talking" are separated by a single space to indicate a short pause therebetween, the words "talking" and "to" are separated by a single space to indicate a short pause therebetween, the words "to" and "you" are separated by a single space to indicate a short pause therebetween, and the words "you" and "buddy" are separated by several spaces to indicate a long pause therebetween. It will be appreciated that the meaning of the various font sizes may be varied, greater or fewer numbers of font sizes may be used, different font sizes may be chosen, or the like, all without departing from the scope of the invention and that the meaning of the number of spaces may be varied, greater or fewer numbers of spaces may be used, or the like, all without departing from the scope of the invention.

TABLE 1

| Element | Length | Volume |
| --- | --- | --- |
| Hey! | 200 mS | Loud |
| <silence> | 300 mS | Silent |

TABLE 1-continued

| Element | Length | Volume |
|---|---|---|
| I'm | 100 mS | Medium |
| <silence> | 20 mS | Silent |
| talking | 300 mS | Medium |
| <silence> | 30 mS | Silent |
| to | 125 mS | Quiet |
| <silence> | 25 mS | Silent |
| you, | 180 mS | Very Loud |
| <silence> | 250 mS | Silent |
| buddy! | 300 mS | Loud |

Recognition results can also be presented to the user in an audio format, for example, by converting the recognition text results back into speech using a text-to-speech conversion and playing the speech back after recognition is complete. Such steps may be carried out, for example, according to processes described elsewhere herein and, in particular, in FIG. 5, and accompanying text, of the aforementioned U.S. Patent Application Pub. No. US 2007/0239837. During playback of the results audio, there are also many options available to integrate ASR metrics into the presented results. For example, artificial audio and speech artifacts can be injected into the speech playback to give the user cues as to what external factors might have impacted ASR performance. These cues could be done in several ways, including, but not limited to, those shown in Table 2.

TABLE 2

| Cue | Description |
|---|---|
| Tone injection | A tone of varying frequency, pitch, volume, phase, or other characteristic is added. |
| Artificial noise injection | Artificial noise of varying characteristics is added. Volume, white vs. pink noise, etc. |
| Noise playback | Noise derived from the original speech recording is isolated and injected back into the results playback to give some user indication as to what audio event may have reduced ASR accuracy. For example, truck horn, jackhammer, door slamming, shouting, etc. The user may not have been aware of the event when making the recording, but now has more understanding as to why the recording failed or was subpar. |
| TTS pronunciation | Emphasis, pauses and questioning inflections (among others) can be added to the TTS playback in order to set off words that have low confidence. For example: "please meet me for (pause) coffee? (pause) at one" |

Commercial Implementation

One commercial implementation of the foregoing principles is the Yap® and Yap9™ service (collectively, "the Yap service"), available from Yap Inc. of Charlotte, N.C. The Yap service includes one or more web applications and a client device application. The Yap web application is a J2EE application built using Java 5. It is designed to be deployed on an application server like IBM WebSphere Application Server or an equivalent J2EE application server. It is designed to be platform neutral, meaning the server hardware and OS can be anything supported by the web application server (e.g. Windows, Linux, MacOS X).

Figure 12:
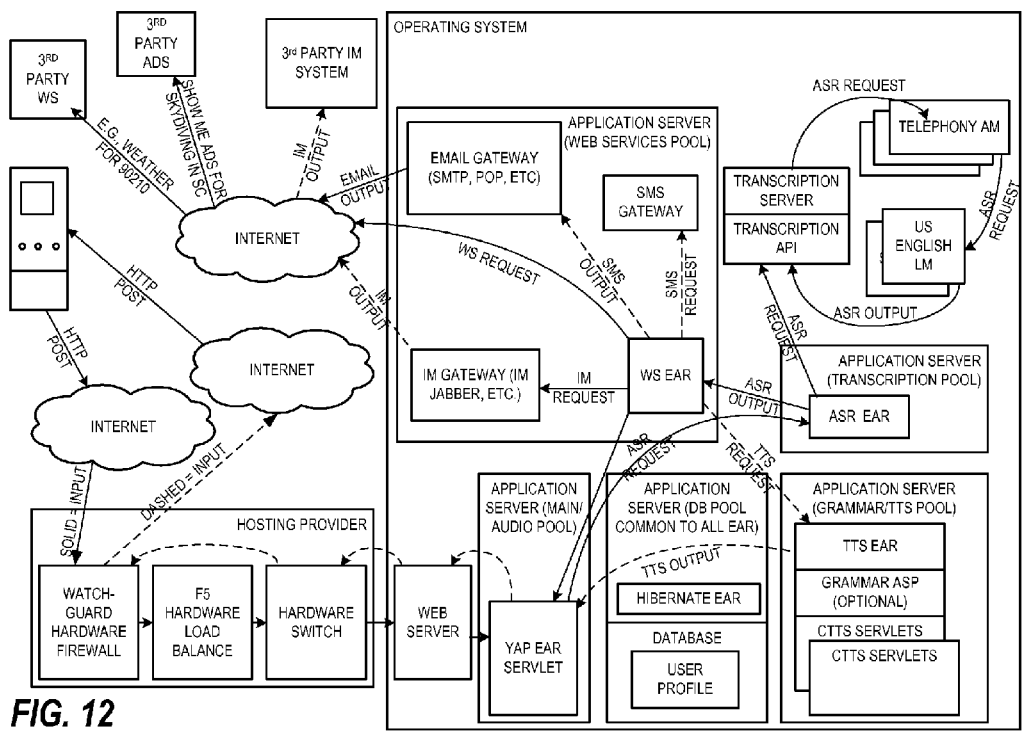
FIG. 12 is a block diagram of the system architecture of one commercial implementation.

FIG. 12 is a block diagram of the system architecture of the Yap commercial implementation. With reference to FIG. 12, the operating system may be implemented in Red Hat Enterprise Linux 5 (RHEL 5); the application servers may include the Websphere Application Server Community Edition (WAS-CE) servers, available from IBM; the web server may be an Apache server; the CTTS Servlets may include CTTS servlets from Loquendo, including US/UK/ES male and US/UK/ES female; the Grammar ASP may be the latest WebSphere Voice Server, available from IBM; suitable third party ads may be provided by Google; a suitable third party IM system is Google Talk, available from Google; and a suitable database system is the DB2 Express relational database system, available from IBM.

Figure 13:
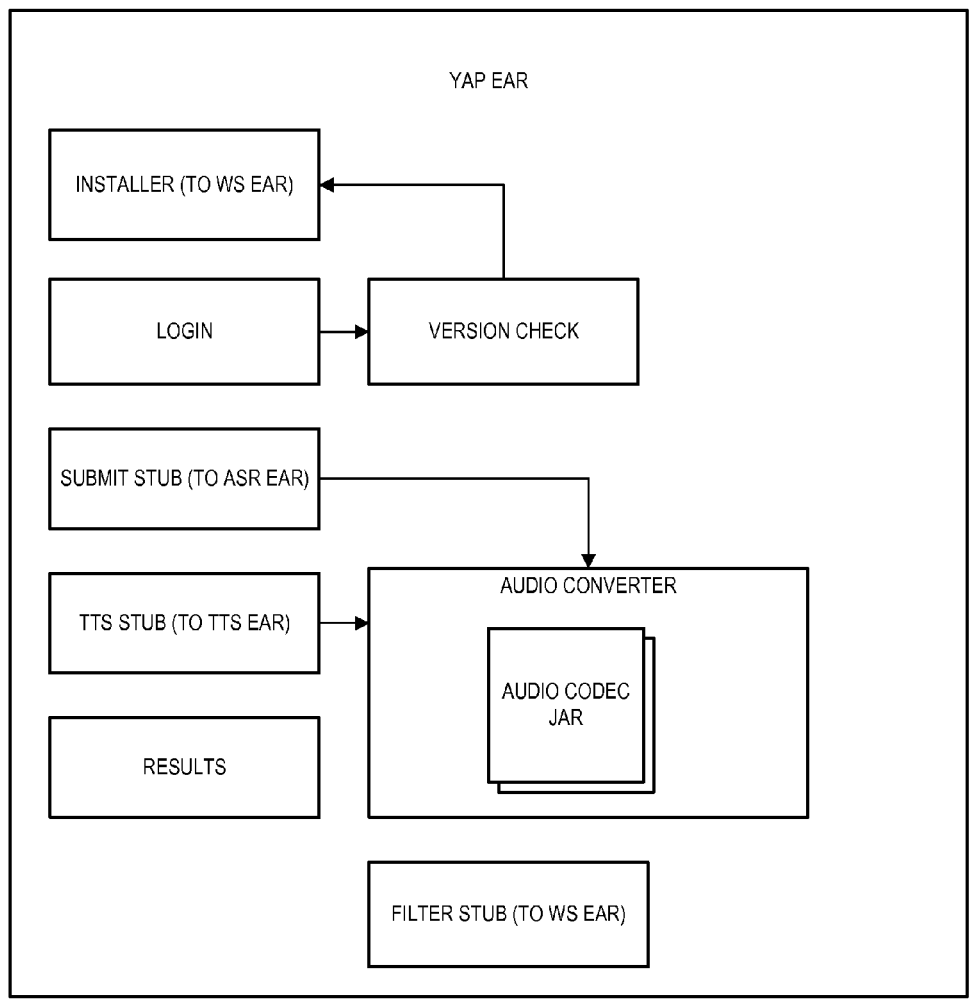
FIG. 13 is a block diagram of a portion of FIG. 12.

FIG. 13 is a block diagram of the Yap EAR of FIG. 12. The audio codec JARs may include the VoiceAge AMR JAR, available from VoiceAge of Montreal, Quebec and/or the QCELP JAR, available from Qualcomm of San Diego, Calif.

The Yap web application includes a plurality of servlets. As used herein, the term "servlet" refers to an object that receives a request and generates a response based on the request. Usually, a servlet is a small Java program that runs within a Web server. Servlets receive and respond to requests from Web clients, usually across HTTP and/or HTTPS, the HyperText Transfer Protocol. Currently, the Yap web application includes nine servlets: Correct, Debug, Install, Login, Notify, Ping, Results, Submit, and TTS. Each servlet is described below in the order typically encountered.

The communication protocol used for all messages between the Yap client and Yap server applications is HTTP and HTTPS. Using these standard web protocols allows the Yap web application to fit well in a web application container. From the application server's point of view, it cannot distinguish between the Yap client midlet and a typical web browser. This aspect of the design is intentional to convince the web application server that the Yap client midlet is actually a web browser. This allows a user to use features of the J2EE web programming model like session management and HTTPS security. It is also an important feature of the client as the MIDP specification requires that clients are allowed to communicate over HTTP.

More specifically, the Yap client uses the POST method and custom headers to pass values to the server. The body of the HTTP message in most cases is irrelevant with the exception of when the client submits audio data to the server in which case the body contains the binary audio data. The Server responds with an HTTP code indicating the success or failure of the request and data in the body which corresponds to the request being made. Preferably, the server does not depend on custom header messages being delivered to the client as the carriers can, and usually do, strip out unknown header values. FIG. 14 is a typical header section of an HTTP request from the Yap client.

The Yap client is operated via a user interface (UI), known as "Yap9," which is well suited for implementing methods of converting an audio message into a text message and messaging in mobile environments. Yap9 is a combined UI for SMS and web services (WS) that makes use of the buttons or keys of the client device by assigning a function to each button (sometimes referred to as a "Yap9" button or key). Execution of such functions is carried out by "Yaplets." This process, and the usage of such buttons, are described elsewhere herein and, in particular, in FIGS. 9A-9D, and accompanying text, of the aforementioned U.S. Patent Application Pub. No. US 2007/0239837.

Usage Process—Install: Installation of the Yap client device application is described in the aforementioned U.S. Patent Application Pub. No. US 2007/0239837 in a subsection titled "Install Process" of a section titled "System Architecture."

Usage Process—Notify: When a Yap client is installed, the install fails, or the install is canceled by the user, the Notify servlet is sent a message by the phone with a short description. This can be used for tracking purposes and to help diagnose any install problems.

Usage Process—Login: When the Yap midlet is opened, the first step is to create a new session by logging into the Yap web application using the Login servlet. Preferably, however, multiple login servers exist, so as a preliminary step, a request is sent to find a server to log in to. Exemplary protocol details for such a request can be seen in FIG. 15. An HTTP string pointing to a selected login server will be returned in response to this request. It will be appreciated that this selection process functions as a poor man's load balancer.

After receiving this response, a login request is sent. Exemplary protocol details for such a request can be seen in FIG. 16. A cookie holding a session ID is returned in response to this request. The session ID is a pointer to a session object on the server which holds the state of the session. This session data will be discarded after a period determined by server policy.

Sessions are typically maintained using client-side cookies, however, a user cannot rely on the set-cookie header successfully returning to the Yap client because the carrier may remove that header from the HTTP response. The solution to this problem is to use the technique of URL rewriting. To do this, the session ID is extracted from the session API, which is returned to the client in the body of the response. This is called the "Yap Cookie" and is used in every subsequent request from the client. The Yap Cookie looks like this:

;jsessionid=C240B217F2351E3C420A599B0878371A

All requests from the client simply append this cookie to the end of each request and the session is maintained:

/Yap/Submit;
jsessionid=C240B217F2351E3C420A599B0878371A

Usage Process—Submit: After receiving a session ID, audio data may be submitted. The user presses and holds one of the Yap-9 buttons, speaks aloud, and releases the pressed button. The speech is recorded, and the recorded speech is then sent in the body of a request to the Submit servlet, which returns a unique receipt that the client can use later to identify this utterance. Exemplary protocol details for such a request can be seen in FIG. 17.

One of the header values sent to the server during the login process is the format in which the device records. That value is stored in the session so the Submit servlet knows how to convert the audio into a format required by the ASR engine. This is done in a separate thread as the process can take some time to complete.

The Yap9 button and Yap9 screen numbers are passed to the Submit server in the HTTP request header. These values are used to lookup a user-defined preference of what each button is assigned to. For example, the 1 button may be used to transcribe audio for an SMS message, while the 2 button is designated for a grammar based recognition to be used in a web services location based search. The Submit servlet determines the appropriate "Yaplet" to use. When the engine has finished transcribing the audio or matching it against a grammar, the results are stored in a hash table in the session.

In the case of transcribed audio for an SMS text message, a number of filters can be applied to the text returned from the ASR engine. Such filters may include, but are not limited to, those shown Table 3.

TABLE 3

| Filter Type | Function |
| --- | --- |
| Ad Filter | Used to scan the text and identify keywords that can be used to insert targeted advertising messages, and/or |

TABLE 3-continued

| Filter Type | Function |
| --- | --- |
| | convert the keywords into hyperlinks to ad sponsored web pages |
| Currency Filter | Used to format currency returned from the speech engine into the user's preferred format. (e.g., "one hundred twenty dollars" -> "$120.00") |
| Date Filter | Used to format dates returned from the speech engine into the user's preferred format. (e.g., "march fourth two thousand seven" -> "3/4/2007") |
| Digit Filter | User to format spelled out single digits returned from the speech engine into a multi-digit number such as a zip code (e.g., "two eight two one one" -> "28211") |
| Engine Filter | Used to remove speech engine words |
| Number Filter | Used to convert the spelled out numbers returned from the speech engine into a digit based number (e.g., "one hundred forty seven" -> "147") |
| Obscenity Filter | Used to place asterisks in for the vowels in street slang (e.g., "sh*t", "f*ck", etc.) |
| Punctuation Filter | Used to format punctuation |
| SMS Filter | Used to convert regular words into a spelling which more closely resembles an SMS message (e.g., "don't forget to smile" -> "don't 4get 2 :)", etc.) |
| Time Filter | Used to format time phrases |

Notably, after all of the filters are applied, both the filtered text and original text are returned to the client so that if text to speech is enabled for the user, the original unfiltered text can be used to generate the TTS audio.

Usage Process—Results: The client retrieves the results of the audio by taking the receipt returned from the Submit servlet and submitting it as a request to the Results servlet. Exemplary protocol details for such a request can be seen in FIG. 18. This is done in a separate thread on the device and a timeout parameter may be specified which will cause the request to return after a certain amount of time if the results are not available. In response to the request, a block of XML is preferably returned. Exemplary protocol details for such a return response can be seen in FIG. 19. Alternatively, a serialized Java Results object may be returned. This object contains a number of getter functions for the client to extract the type of results screen to advance to (i.e., SMS or results list), the text to display, the text to be used for TTS, any advertising text to be displayed, an SMS trailer to append to the SMS message, etc.

Usage Process—TTS: The user may choose to have the results read back via Text to Speech. This can be an option the user could disable to save network bandwidth, but adds value when in a situation where looking at the screen is not desirable, like when driving. If TTS is used, the TTS string is extracted from the results and sent via an HTTP request to the TTS servlet. Exemplary protocol details for such a request can be seen in FIG. 20. The request blocks until the TTS is generated and returns audio in the format supported by the phone in the body of the result. This is performed in a separate thread on the device since the transaction may take some time to complete. The resulting audio is then played to the user through the AudioService object on the client. Preferably, TTS speech from the server is encrypted using Corrected Block Tiny Encryption Algorithm (XXTEA) encryption.

Usage Process—Correct: As a means of tracking accuracy and improving future SMS based language models, if the user makes a correction to transcribed text on the phone via the keypad before sending the message, the corrected text is submitted to the Correct servlet along with the receipt for the request. This information is stored on the server for later use in analyzing accuracy and compiling a database of typical SMS messages. Exemplary protocol details for such a submission can be seen in FIG. 21.

Usage Process—Ping: Typically, web sessions will timeout after a certain amount of inactivity. The Ping servlet can be used to send a quick message from the client to keep the session alive. Exemplary protocol details for such a message can be seen in FIG. 22.

Usage Process—Debug: Used mainly for development purposes, the Debug servlet sends logging messages from the client to a debug log on the server. Exemplary protocol details can be seen in FIG. 23.

Usage Process—Logout: To logout from the Yap server, an HTTP logout request needs to be issued to the server. An exemplary such request would take the form: "/Yap/Logout;jsessionid=1234", where 1234 is the session ID.

User Preferences: In at least one embodiment, the Yap website has a section where the user can log in and customize their Yap client preferences. This allows them to choose from available Yaplets and assign them to Yap9 keys on their phone. The user preferences are stored and maintained on the server and accessible from the Yap web application. This frees the Yap client from having to know about all of the different back-end Yaplets. It just records the audio, submits it to the server along with the Yap9 key and Yap9 screen used for the recording and waits for the results. The server handles all of the details of what the user actually wants to have happen with the audio.

The client needs to know what type of format to utilize when presenting the results to the user. This is accomplished through a code in the Results object. The majority of requests fall into one of two categories: sending an SMS message, or displaying the results of a web services query in a list format. Notably, although these two are the most common, the Yap architecture supports the addition of new formats.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer-implemented method comprising:
receiving a first transcription comprising first text and second text, wherein the first transcription was created by transcribing first audio data using a speech recognition engine configured to filter the first transcription by automatically replacing one or more words with corresponding numbers or digits formatted as a telephone number;
receiving a first value associated with the first text and a second value associated with the second text; and
causing presentation of the first text with a first graphical element indicating the first value and presentation of the second text with a second graphical element indicating the second value.

2. The computer-implemented method of claim 1, wherein the first value indicates a volume level of a portion of the first audio data corresponding to the first text, a level of background noise in the portion of the first audio data, or a confidence level associated with the first text as determined by the speech recognition engine.

3. The computer-implemented method of claim 1, wherein the first graphical element comprises font color, font grayscale, font weight, font size, or underlining.

4. The computer-implemented method of claim 1, wherein the first audio data comprises at least part of a voicemail message.

5. The computer-implemented method of claim 1, further comprising causing the telephone number to be presented as a hyperlink.

6. The computer-implemented method of claim 1, further comprising:
receiving a second transcription comprising third text, wherein the third text comprises a modified version of the first text; and
causing presentation of the third text.

7. A system comprising:
an electronic data store configured to store transcription information; and
one or more computing devices in communication with the electronic data store, the one or more computing systems configured to at least:
receive a first transcription comprising first text and second text, wherein the first transcription was created by transcribing first audio data using a speech recognition engine configured to filter the first transcription by automatically replacing one or more words with corresponding numbers or digits formatted as a telephone number;
receive a first value associated with the first text and a second value associated with the second text; and
cause presentation of the first text with a first graphical element indicating the first value and a second graphical element indicating the second value.

8. The system of claim 7, wherein the first graphical element comprises a lighter color if the first value is in a lower range, or a darker color if the first value is in a higher range.

9. The system of claim 8, wherein the lighter color is gray and the darker color is black.

10. The system of claim 7, wherein the first audio data comprises at least part of a voicemail message.

11. The system of claim 7, wherein the one or more computing devices are further configured to cause the telephone number to be presented as a hyperlink.

12. The system of claim 7, wherein the second value indicates a volume level of a portion of the first audio data corresponding to the second text, a level of background noise in the portion of the first audio data, or a confidence level associated with the second text as determined by the speech recognition engine.

13. The system of claim 7, wherein the one or more computing devices are further configured to:
receive a second transcription comprising third text, wherein the third text comprises a modified version of the first text; and
cause presentation of the third text.

14. A non-transitory computer-readable medium storing instructions that, when executed by a processor on a computing device, cause the computing device to at least:
receive a first transcription comprising first text and second text, wherein the first transcription was created by transcribing first audio data using a speech recognition engine configured to filter the first transcription by automatically replacing one or more words with corresponding numbers or digits formatted as a telephone number;
receive a first value associated with the first text and a second confidence value associated with the second text; and
cause presentation of the first text with a first graphical element indicating the first value and presentation of the second text with a second graphical element indicating the second value.

15. The non-transitory computer-readable medium of claim 14, wherein the first graphical element indicates a volume level associated with a portion of the first audio data corresponding to the first text and is presented substantially simultaneously with the presentation of the first text.

16. The non-transitory computer-readable medium of claim 14, wherein the first graphical element comprises font color, font grayscale, font weight, font size, or underlining.

17. The non-transitory computer-readable medium of claim 14, wherein the first audio data comprises at least part of a voicemail message.

18. The non-transitory computer-readable medium of claim 14, further comprising instructions to present the telephone number as a hyperlink.

19. The non-transitory computer-readable medium of claim 14, wherein the first audio data is captured at a first device and the first text is presented at a second device.

20. The non-transitory computer-readable medium of claim 14, further comprising instructions to:
receive a second transcription comprising third text, wherein the third text is a modified version of the first text; and
cause presentation of the third text.

\* \* \* \* \*